United States Patent [19]
Mori et al.

[11] Patent Number: 5,735,451
[45] Date of Patent: Apr. 7, 1998

[54] METHOD AND APPARATUS FOR BONDING USING BRAZING MATERIAL

[75] Inventors: Yoshiaki Mori; Takuya Miyakawa; Yasuhiko Asano; Osamu Kurashina; Satoshi Miyamori; Yohei Kurashima; Makoto Anan, all of Suwa, Japan

[73] Assignee: Seiko Epson Corporation, Toky, Japan

[21] Appl. No.: 347,398
[22] PCT Filed: Apr. 5, 1994
[86] PCT No.: PCT/JP94/00562
 § 371 Date: Feb. 10, 1995
 § 102(e) Date: Feb. 10, 1995
[87] PCT Pub. No.: WO94/22628
 PCT Pub. Date: Oct. 13, 1994

[30] Foreign Application Priority Data

Apr. 5, 1993 [JP] Japan .................. 5-078309
May 14, 1993 [JP] Japan .................. 5-113204

[51] Int. Cl.⁶ .................. B23K 31/02; B23K 35/38
[52] U.S. Cl. .................. 228/206; 228/211; 228/42
[58] Field of Search .................. 228/207, 206, 228/211, 42

[56] References Cited

U.S. PATENT DOCUMENTS

| | | |
|---|---|---|
| 3,762,941 | 10/1973 | Hou . |
| 4,012,307 | 3/1977 | Phillips . |
| 4,430,547 | 2/1984 | Yoneda et al. . |
| 4,705,593 | 11/1987 | Haight et al. . |
| 4,708,766 | 11/1987 | Hynecek . |
| 4,749,440 | 6/1988 | Blackwood et al. . |
| 4,857,382 | 8/1989 | Liu et al. . |
| 4,921,157 | 5/1990 | Dishon et al. . |
| 5,000,819 | 3/1991 | Pedder et al. .................. 228/180.21 |
| 5,045,166 | 9/1991 | Bobbio . |
| 5,120,568 | 6/1992 | Schuurmans et al. . |
| 5,126,164 | 6/1992 | Okazaki et al. . |
| 5,147,520 | 9/1992 | Bobbio . |
| 5,178,682 | 1/1993 | Tsukamoto et al. . |
| 5,192,582 | 3/1993 | Liedke et al. .................. 228/206 |
| 5,201,995 | 4/1993 | Reisman et al. . |
| 5,225,659 | 7/1993 | Kusano et al. . |
| 5,240,559 | 8/1993 | Ishida . |
| 5,290,378 | 3/1994 | Kusano et al. . |
| 5,292,370 | 3/1994 | Tsai et al. . |
| 5,316,739 | 5/1994 | Yoshikawa et al. . |
| 5,340,618 | 8/1994 | Tanisaki et al. . |

(List continued on next page.)

FOREIGN PATENT DOCUMENTS

| | | | |
|---|---|---|---|
| 371693 | 6/1990 | European Pat. Off. . | |
| 427020A2 | 5/1991 | European Pat. Off. .................. | 228/211 |
| 557756A1 | 9/1993 | European Pat. Off. .................. | 228/206 |
| 1-125829 | 5/1963 | Japan . | |
| 59-158525 | 9/1984 | Japan . | |
| 2-281734 | 11/1990 | Japan . | |
| 3-174972 | 7/1991 | Japan .................. | 228/206 |
| 6-190269 | 12/1992 | Japan . | |
| 5-82478 | 4/1993 | Japan . | |
| 6-2149 | 1/1994 | Japan . | |
| 60-1861 | 8/1995 | Japan . | |

Primary Examiner—P. Austin Bradley
Assistant Examiner—Jeffrey T. Knapp
Attorney, Agent, or Firm—Stroock & Stroock & Lavan LLP

[57] ABSTRACT

High frequency electrical discharge or nonpolar discharge using microwaves is generated in a gas that is introduced into a gas duct formed by a dielectric material, such as glass or ceramic. Surface treatment is applied to components, which are under atmospheric pressure, by exposing them to the gas flow containing the active species generated by the above mentioned electrical discharge. The components are soldered before, during, or after the application of this surface treatment. The surface of the components is exposed to the active species by either directly exposing the components to the electrical discharge, or by directing the reactive gas flow containing the active species at the component surfaces. By selecting an appropriate gas for generating the active species, it is possible to improve the wettability of the surface of the component to be soldered, or to remove organic substances or oxide film surfaces.

58 Claims, 12 Drawing Sheets

U.S. PATENT DOCUMENTS

| | | |
|---|---|---|
| 5,368,685 | 11/1994 | Kumihashi et al. . |
| 5,384,167 | 1/1995 | Nishiwaki et al. . |
| 5,391,855 | 2/1995 | Tanisaki . |
| 5,399,830 | 3/1995 | Maruyama . |
| 5,407,121 | 4/1995 | Koopman et al. ................ 228/206 |
| 5,499,432 | 3/1996 | Hanawa . |
| 5,499,754 | 3/1996 | Bobbio et al. . |
| 5,597,438 | 1/1997 | Grewal et al. . |

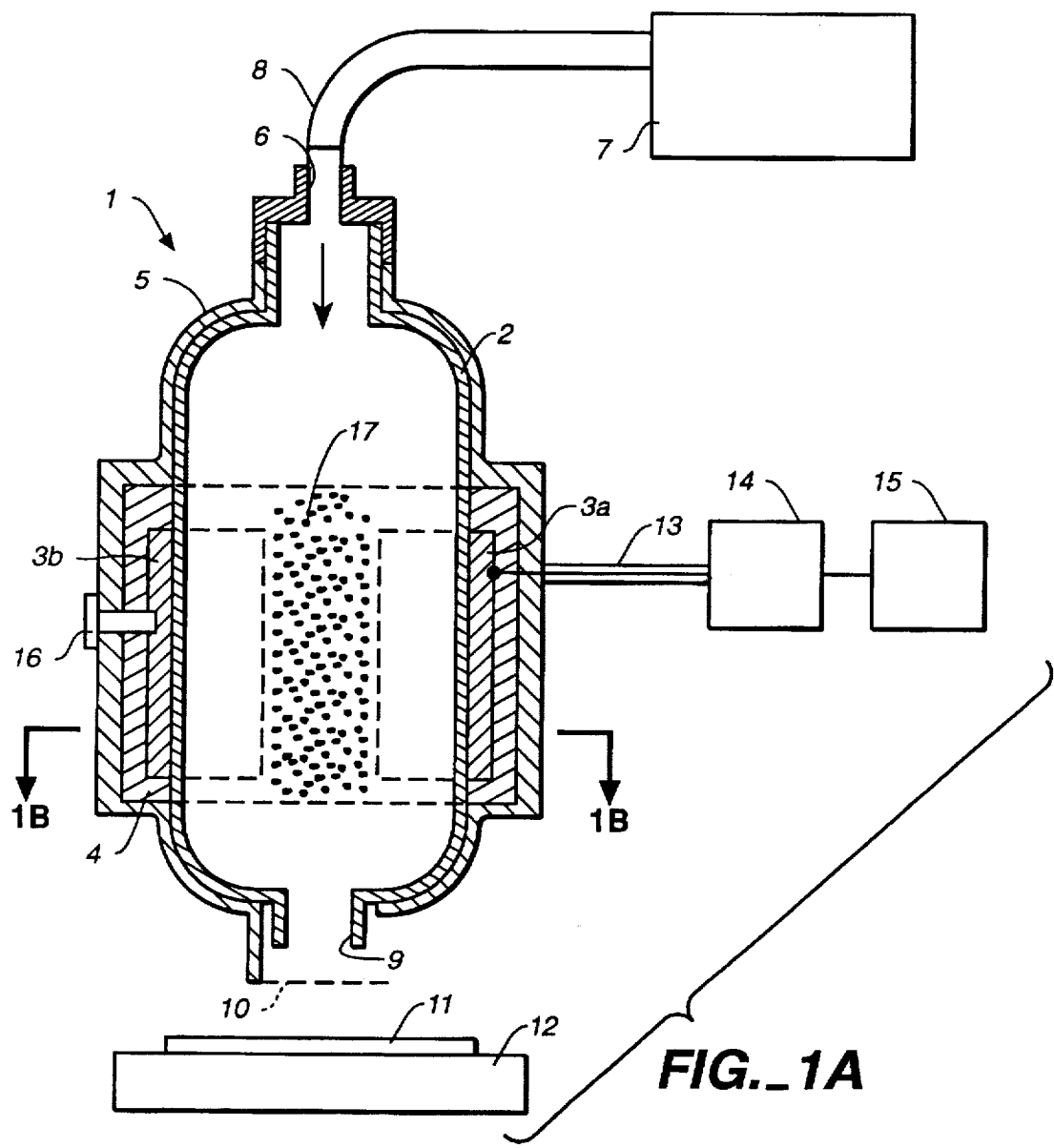
FIG._1A
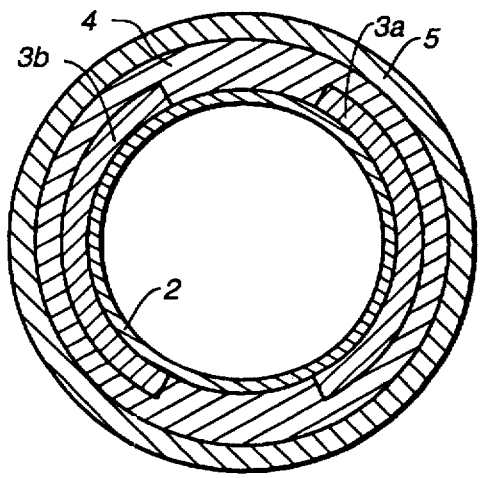
FIG._1B

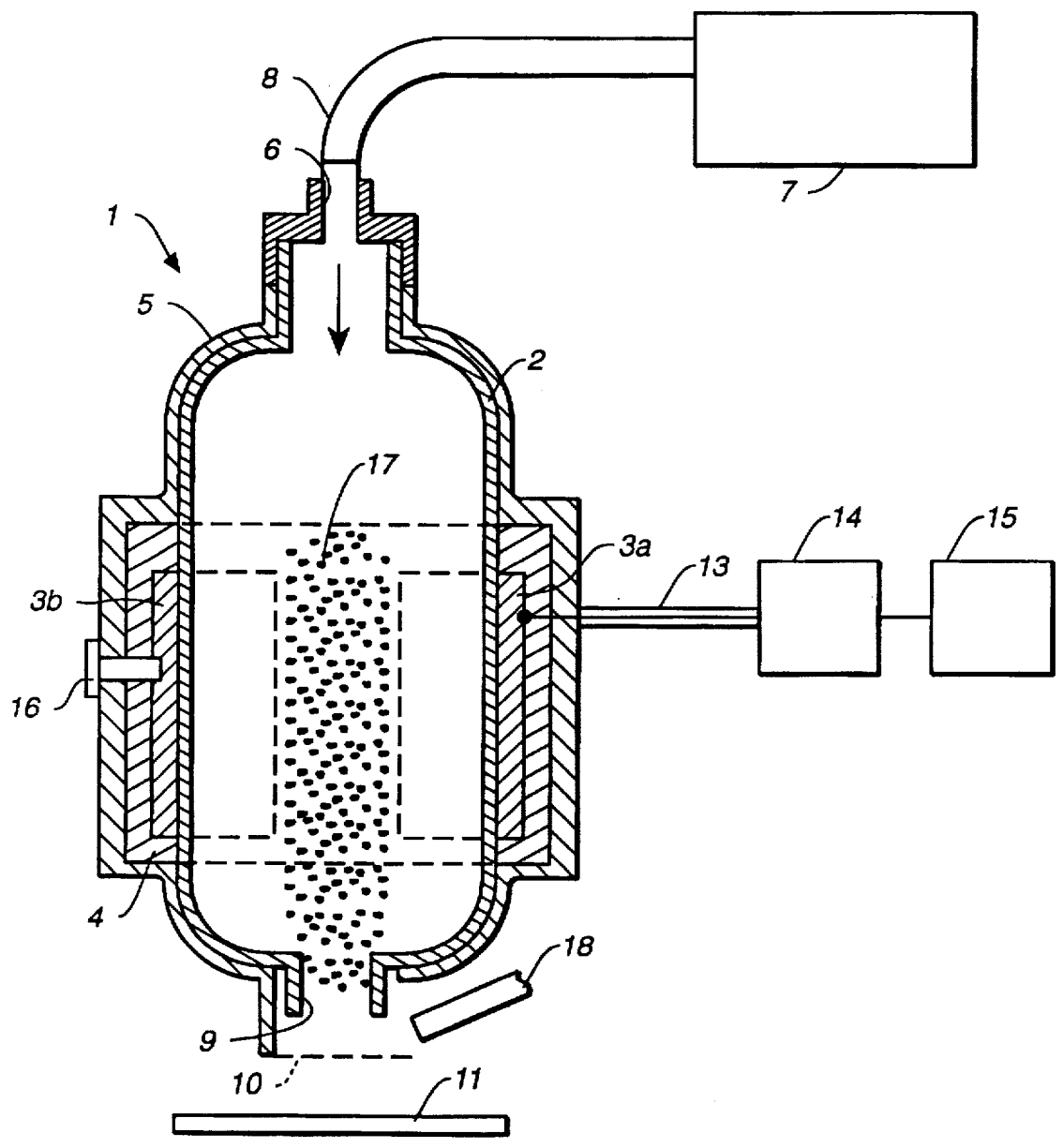
FIG._2

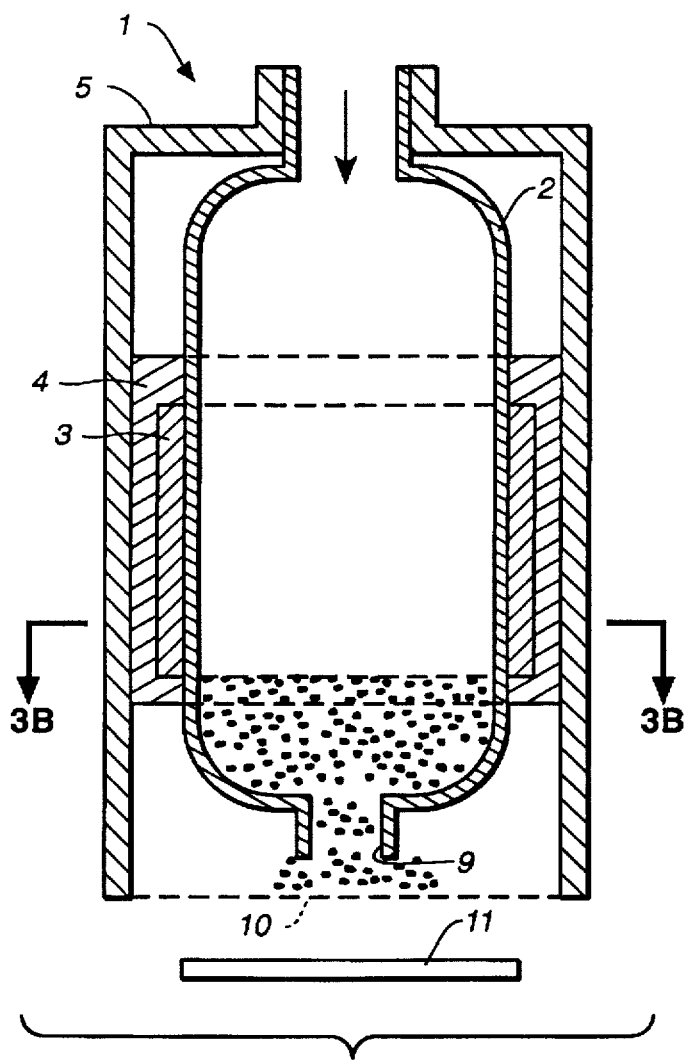
FIG._3A
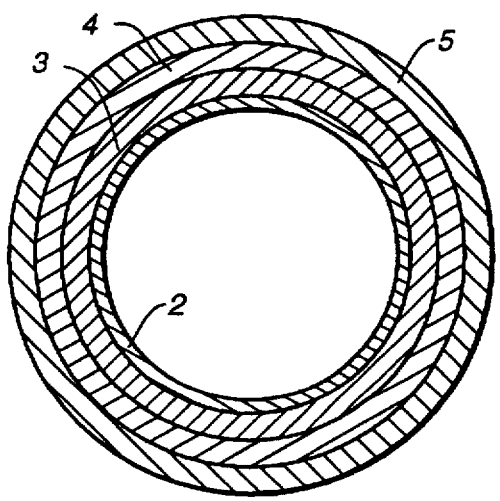
FIG._3B

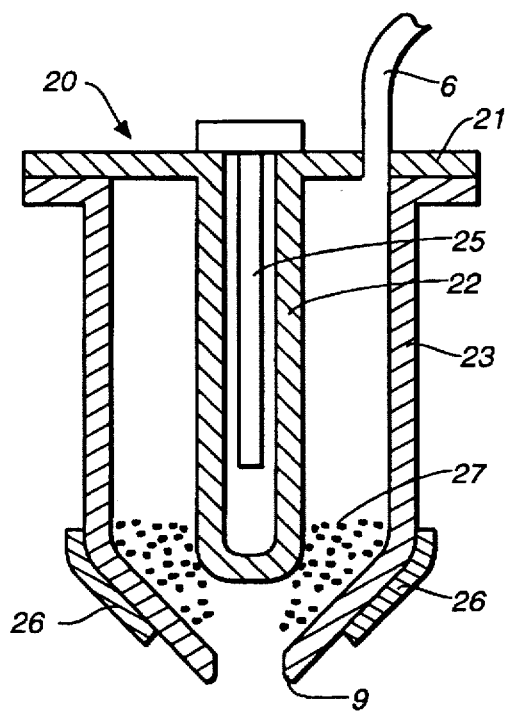
FIG._4
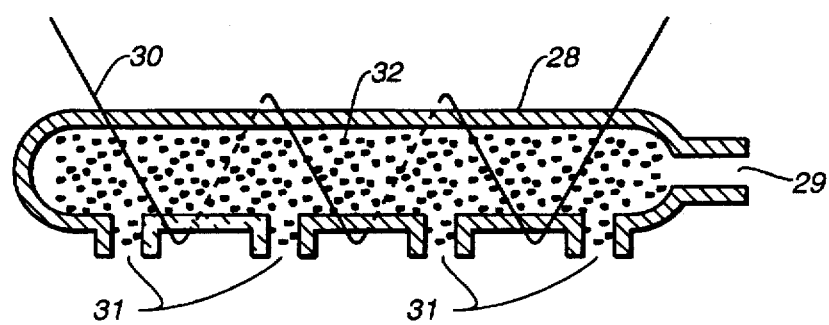
FIG._5A
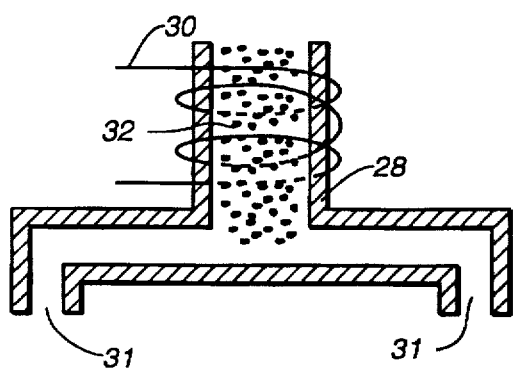
FIG._5B
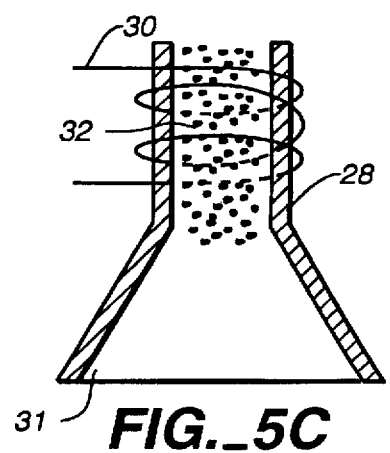
FIG._5C

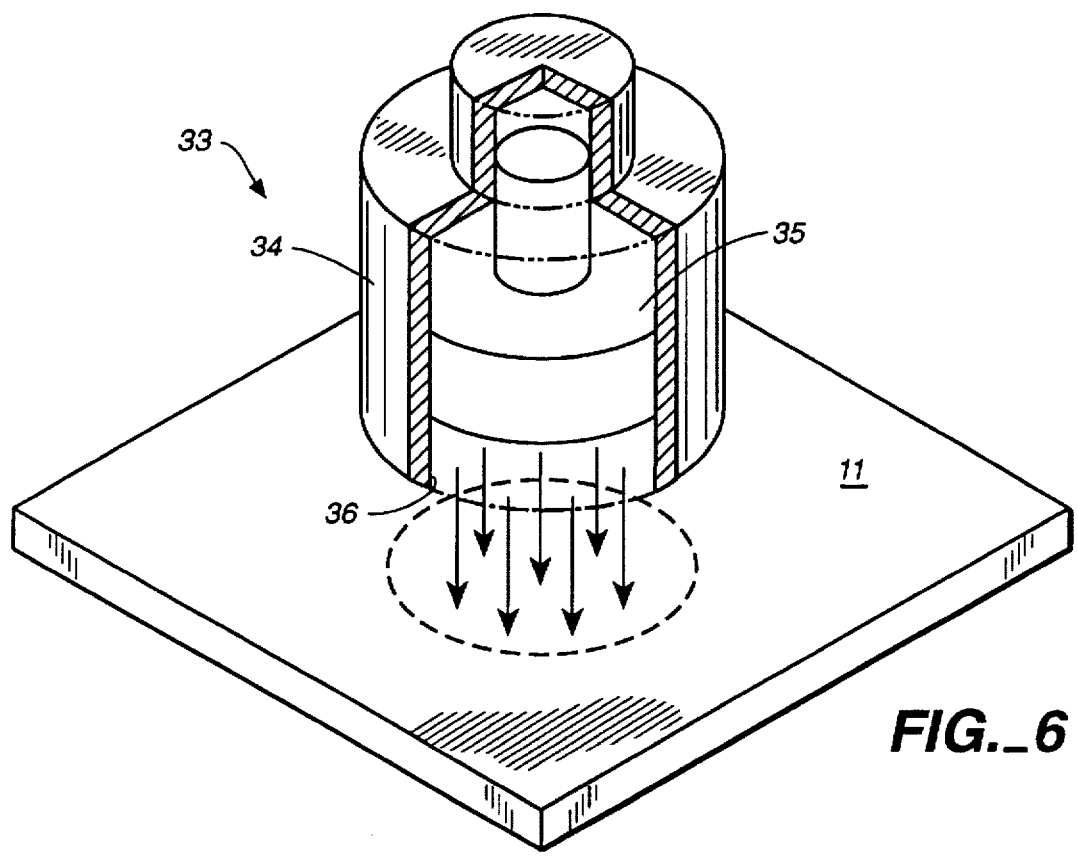
FIG._6
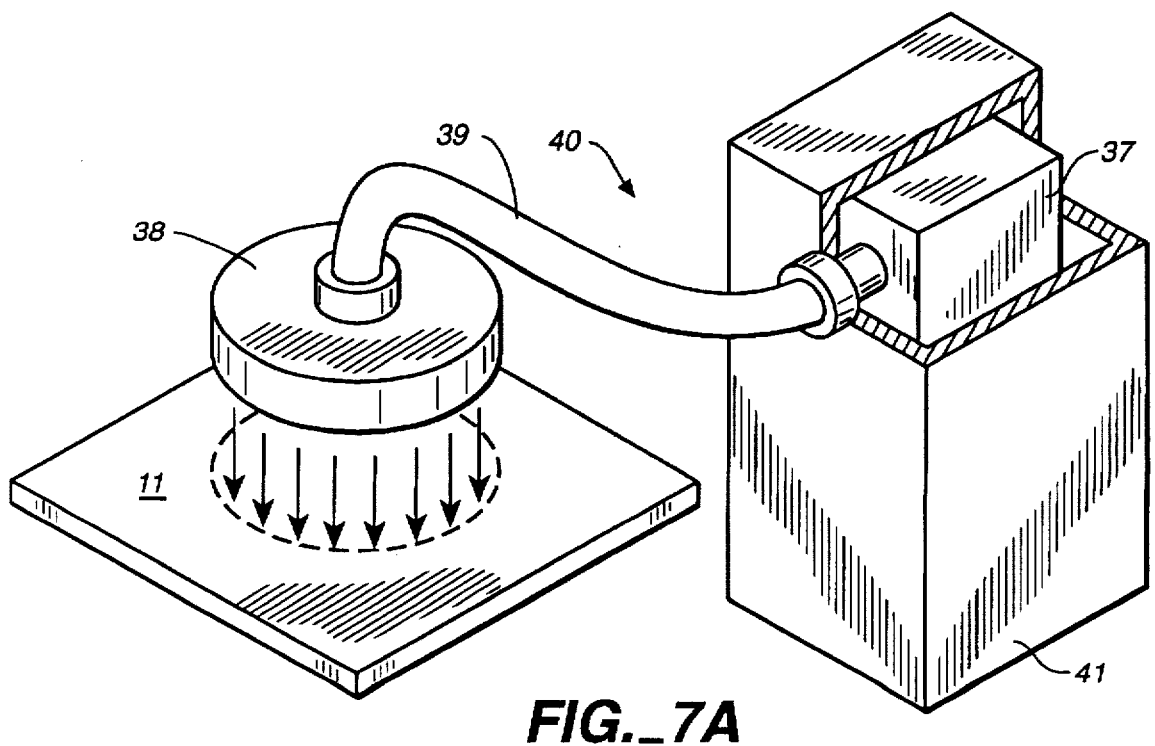
FIG._7A

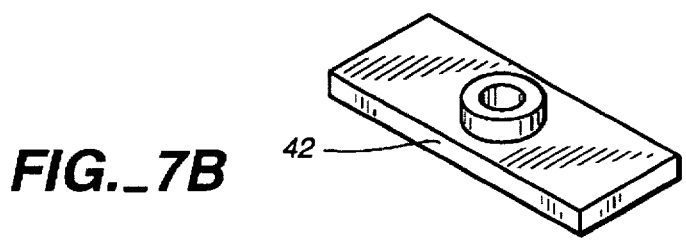
FIG._7B
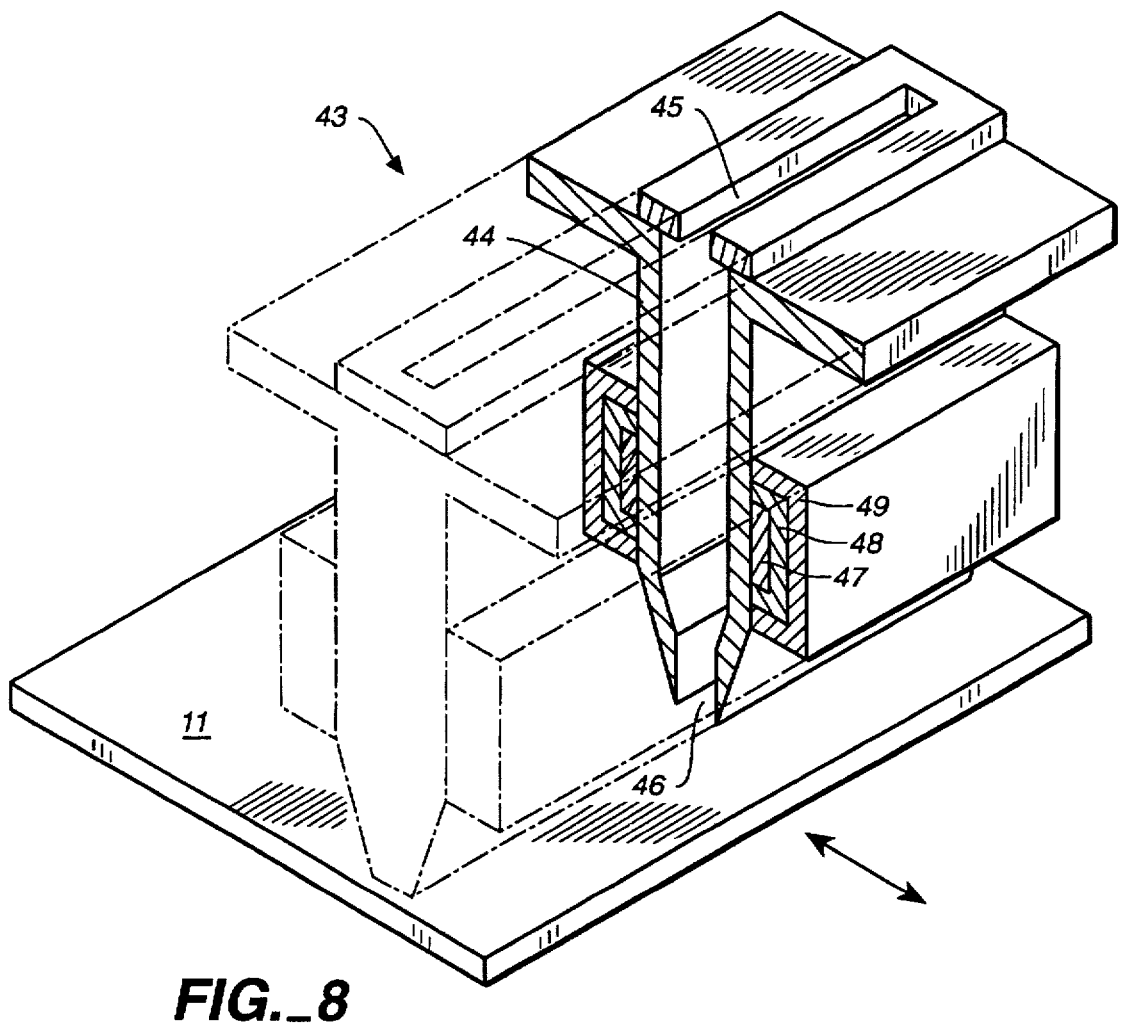
FIG._8

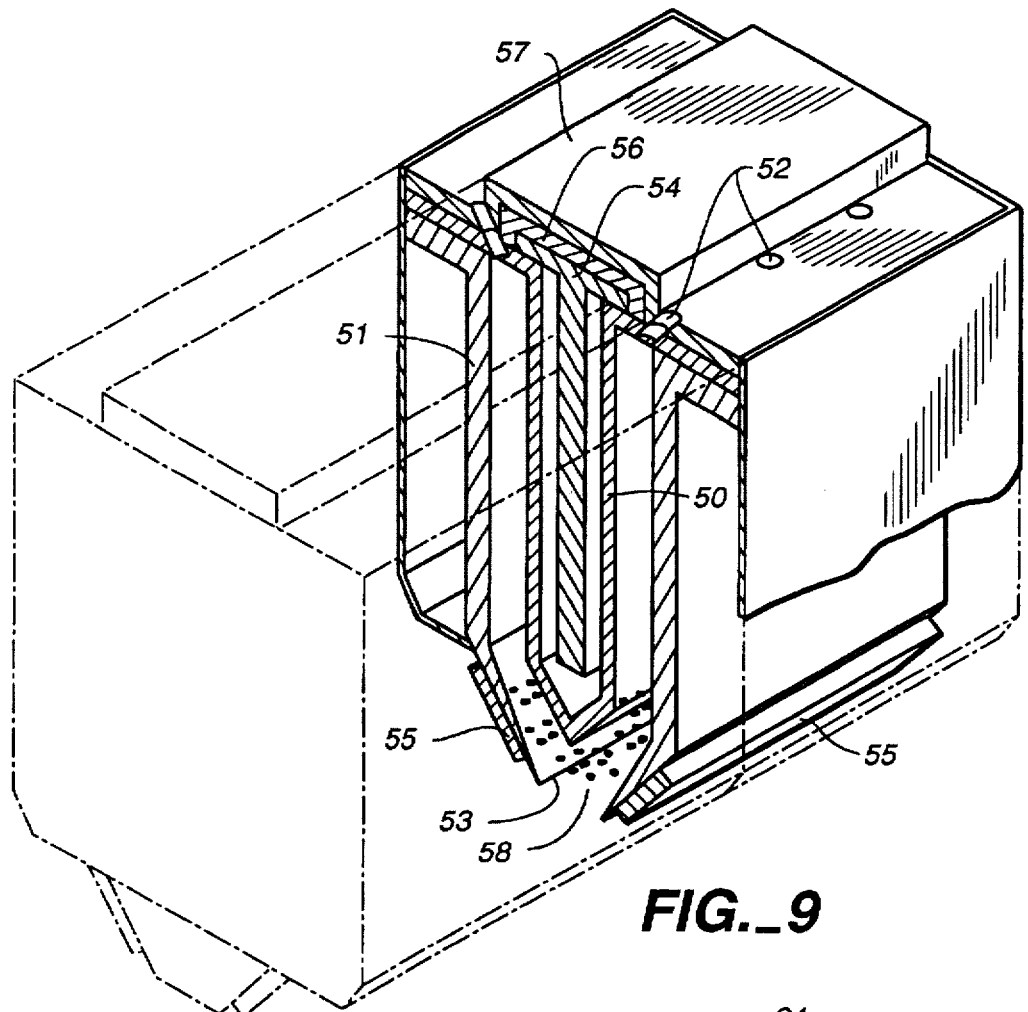
FIG._9
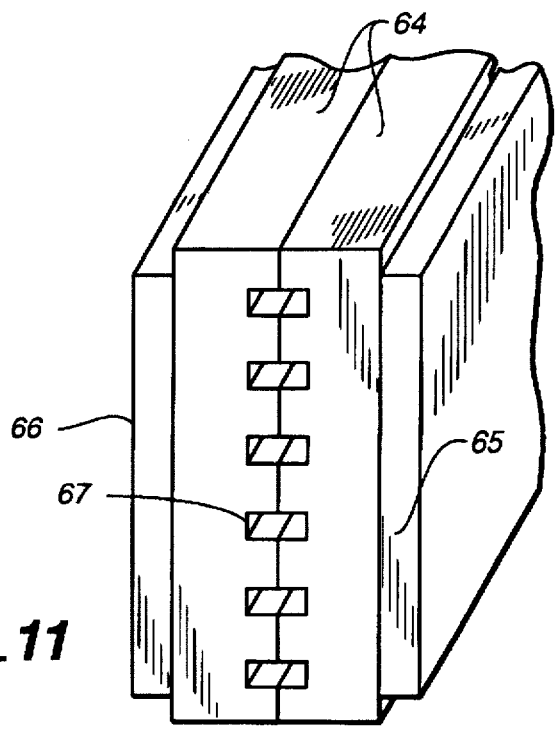
FIG._11

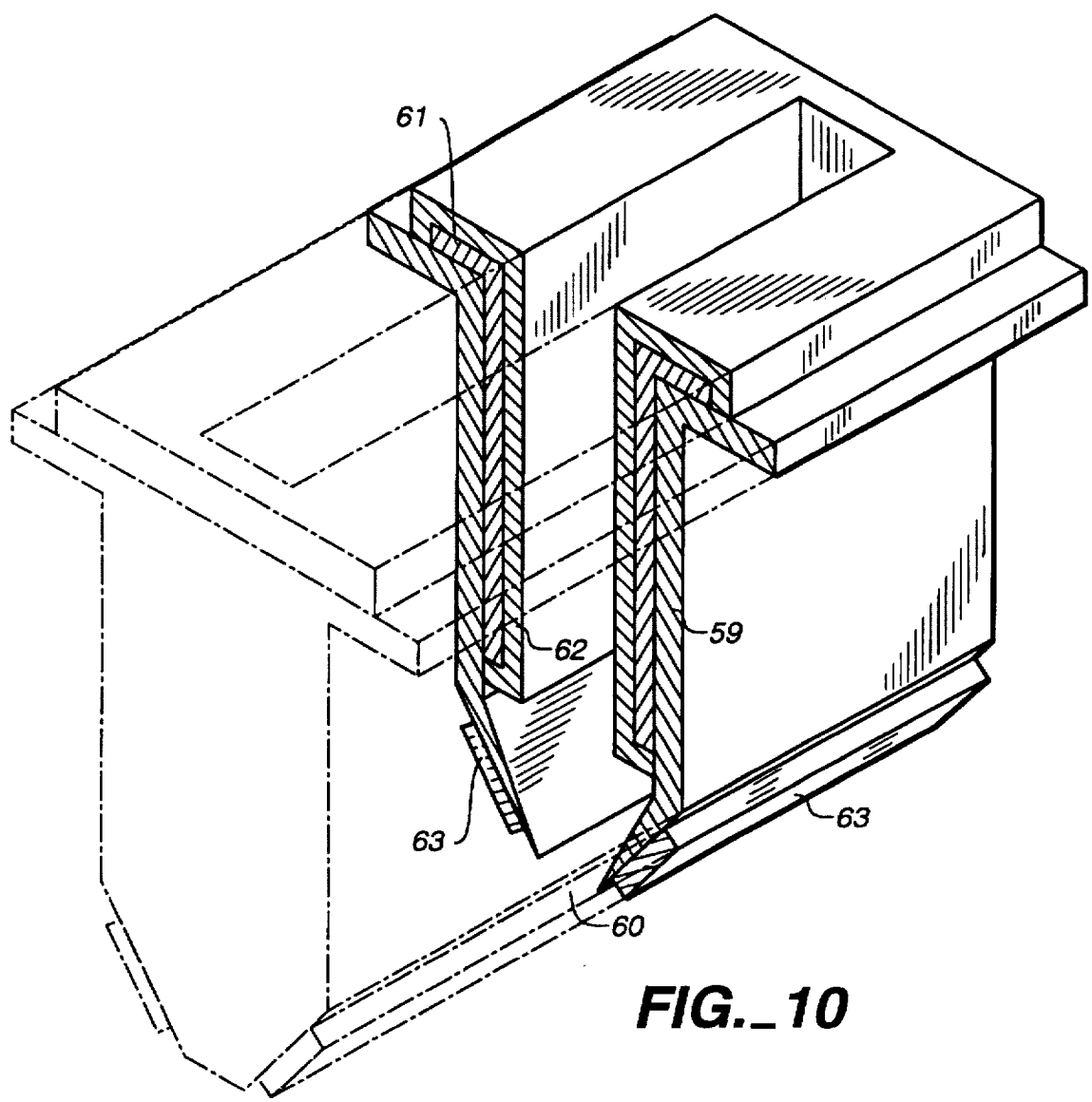
FIG._10
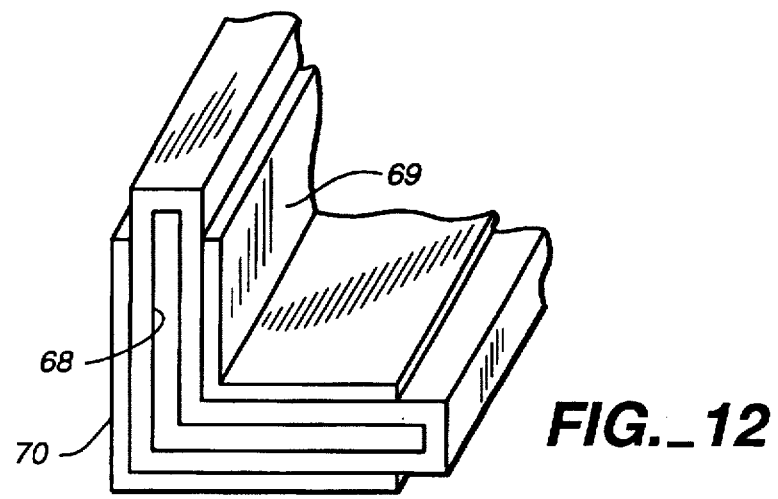
FIG._12

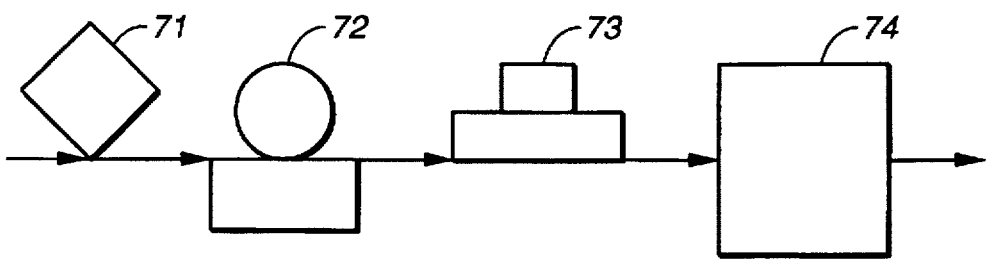
FIG._13
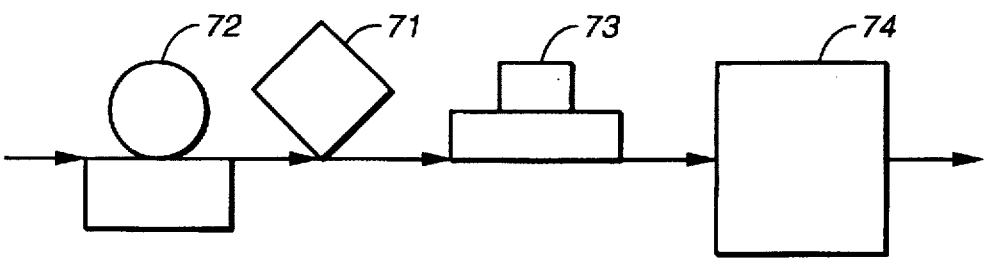
FIG._14
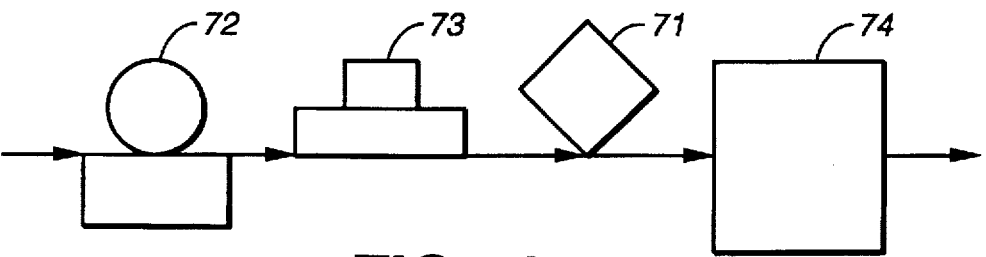
FIG._15

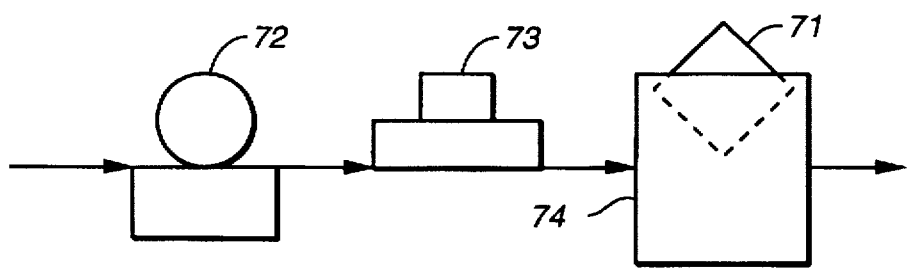
FIG._16
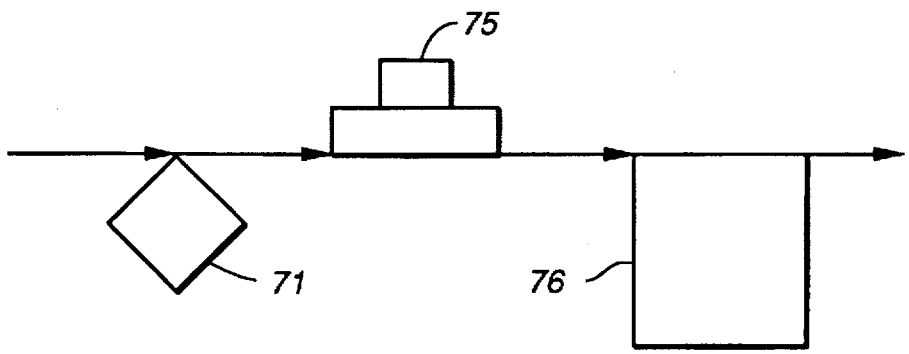
FIG._17
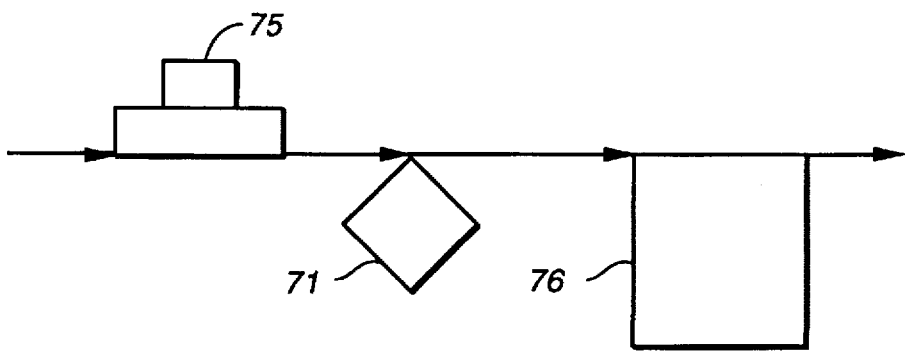
FIG._18

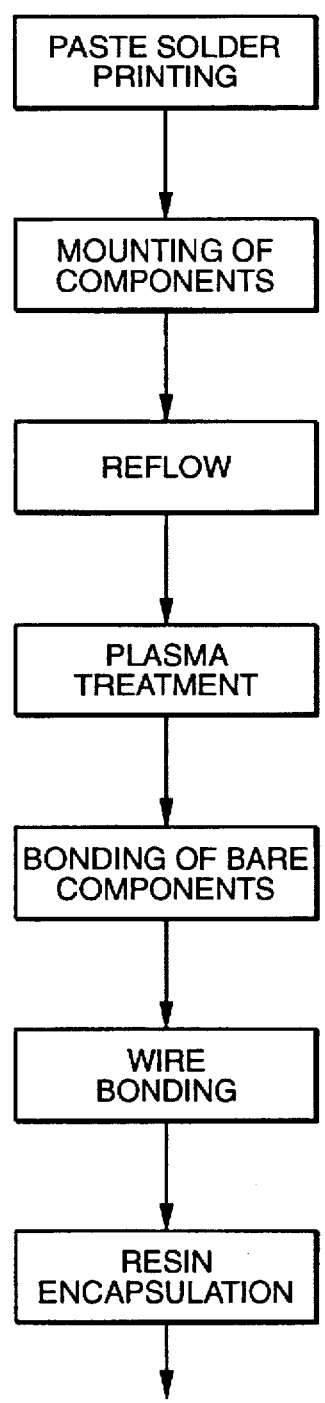
FIG._19
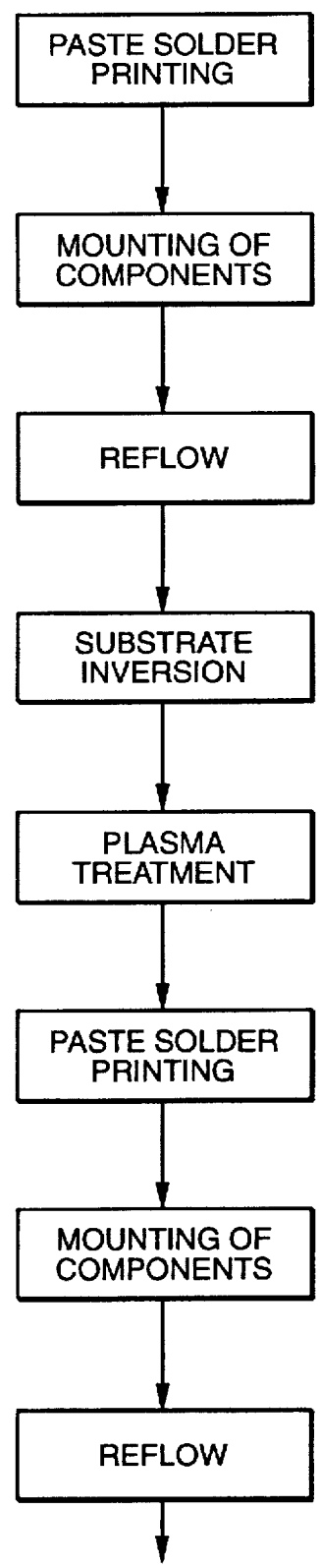
FIG._20

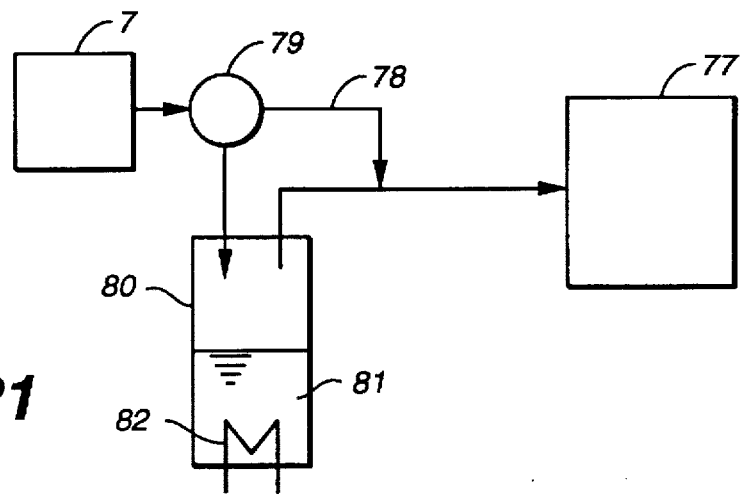
FIG._21
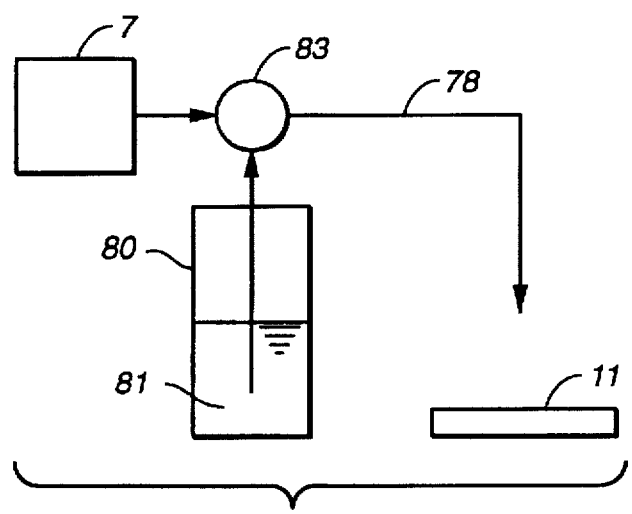
FIG._22
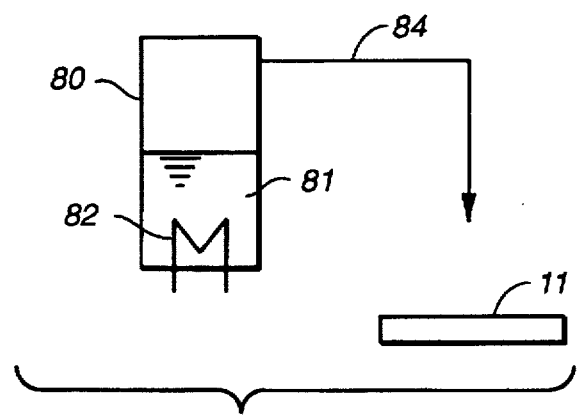
FIG._23

METHOD AND APPARATUS FOR BONDING USING BRAZING MATERIAL

BACKGROUND OF THE INVENTION

1. Field of Technology

This invention relates to a brazing technology that uses a brazing material to bond components, and more particularly to a soldering method and an apparatus that are suitable to soldering applications in fine pitch areas, such as in bonding electronic components to a printed circuit board.

2. Background Technology

Traditionally, the flow method and the reflow method have been used as the soldering methods most suitable for industrial mass production. For example, when the flow method is used for mounting components onto a printed circuit board (hereafter referred to as "substrate"), the substrate on which components have been placed is coated with flux, and then soldering is achieved by passing said substrate through a molten solder bath. In the reflow soldering method, a mixture of flux and soldering paste is printed onto the part of the substrate on which components are to be soldered. Then, after the components are placed on the substrate, soldering is achieved by passing said substrate through a heating oven called a "reflow oven." However, it is difficult to stably produce a uniform coating of flux on the bonding surface. For this reason, this coating step has become a major obstacle to achieving automation, as substrate patterns have become finer and assembly density has increased. Furthermore, in both methods, the residual flux on the substrate is corrosive, and thus, it is necessary to rinse the substrate after soldering. Additionally, when soldering a TAB substrate to a liquid crystal panel, the risk exists that the flux may splash and contaminate the polarizing film. Consequently, it is necessary to attach a protective film to the polarizing film beforehand, and to remove it after soldering is finished. This requirement increases the number of process steps, time, and labor, resulting in increased manufacturing costs.

Known methods of removing organic substances, such as flux, include the wet rinse method which uses an organic solvent, and the dry rinse method which removes organic substances by causing a chemical reaction in them through irradiation with ozone, or ultraviolet light, etc. However, the wet rinse method requires an additional rinsing process for removing the rinsing agent after the organic substances have been rinsed off, a process for drying the substrate, and a stationary facility for performing these processes. These additional requirements necessitate a massive amount of time and labor and result in increased manufacturing costs. On the other hand, thorough rinsing cannot be expected in the dry rinse method since it is difficult to completely remove organic substances possessing especially large molar weight.

To avoid these problems, no-rinse fluxes containing very little or no active species, such as chlorine, have been in use recently. However, because these fluxes possess poorer wettability than conventional fluxes, they have raised concerns that the resulting solder may be incomplete or may possess insufficient bonding strength.

Furthermore, when components must be soldered on both sides of a substrate, the heat treatment applied during the process up to that point causes the formation of an oxide film (CuO) on the surface of copper pads and electrodes, along with the loss of even the initial level of wettability, and, in some cases, leads to increased contact resistance during soldering.

Published Japanese patent application No. H03-174972 discusses a method which obtains excellent adhesion of a soldering material to a substrate. In this method, the substrate surface is coated with the soldering material, after using an argon gas atmosphere in vacuum to generate an electrical discharge, and this discharge is used to remove impurities from the surface of the substrate and to improve its wettability. However, this method requires a vacuum pump and a vacuum chamber for obtaining the vacuum atmosphere, making the overall equipment large and complicated. Furthermore, argon, the gas used, does improve the wettability between the soldering paste solvent and the substrate, thus improving the adhesion quality of the paste solder. However, it does not improve the wettability of the solder substrate since it does not remove the oxide film. Therefore, it is necessary to coat the soldering surface with a flux in order to remove the oxide film before soldering, and consequently, this flux must be rinsed off after soldering.

Furthermore, published Japanese patent application No. S3-127965 discusses a device that is equipped with a second switch for generating arc discharge with the component to be soldered, and for quickly heating said component. This device makes it easy to solder said component, even if its heat capacity is large.

However, with this device, the electrical discharge is used to generate the heat required for soldering, and cannot be used to remove the oxide film. Furthermore, since the gas used is inert, removal of the oxide film is impossible in theory. This method also requires that the soldering surface be coated with a flux in order to remove the oxide film, which must then be rinsed off after soldering.

The invention solves these above mentioned problems associated with conventional technologies, and its objective is to provide a method and a device for the soldering technology used for bonding two components, that can easily and thoroughly improve the wettability of the surfaces to be bonded.

The second objective of the invention is to provide a method and a device for soldering using a low corrosive, no-rinse flux, or without the use of a flux.

It is another objective of the invention, in cases involving the bonding of electronic components to a substrate by soldering, to provide a method and a device that improve the wettability of the substrate without damaging it, and that make it possible to always obtain good soldering results, even for bonding involving fine wiring patterns or minute areas.

SUMMARY OF THE INVENTION

The invention provides a method that uses a brazing material to bond two components into one, characterized in that said method causes a gas discharge in a gas that is at or close to atmospheric pressure; and in that said method includes a surface treatment process of exposing the surface of at least one of the components to the active gas species generated in the gas by the electrical discharge. An excellent bond can be obtained by applying such a surface treatment at least before, during, or after the bonding of the two components.

Furthermore, when solder is used as the brazing material, the invention provides a soldering method that, by properly selecting the gas used for gas discharge, can remove in advance such undesirable substances as oxide from the surface to be bonded, thus improving the wettability with the solder and effectively removing organic substances such as flux that remain after soldering. In particular, this substantial improvement in the wettability enables soldering without the use of flux, or using a no-rinse flux with low wettability.

When soldering using the flow method, it is recommended that the surface treatment of the invention be applied either before or after soldering. When soldering using the reflow method, it is recommended that the above mentioned surface treatment using gas discharge be applied before adhering solder, after adhering solder but before aligning the components to be bonded, or during the heating process for soldering.

To improve wettability, all types of gases, such as helium and nitrogen, are effective. To obtain an ashing effect, compressed air, helium, or a mixed gas of nitrogen and oxygen is effective. For etching, a mixed gas, such as a mixture of helium or compressed air and fluorocarbon compounds ($CF_4$, $C_2F_6$) or $SF_6$ is effective.

Additionally, the invention can further increase the above mentioned effect by introducing moisture or water vapor when exposing the surface of the material to be treated to an active species. This is accomplished by adding steam or directly supplying moisture to the surface of said material to be treated before the above mentioned gas is supplied.

A good gas discharge can be generated by using high frequency voltage, or nonpolar discharge using micro waves. The recommended frequencies are 13.56 MHz or around 10–30 KHz.

The invention also provides an apparatus that uses a brazing material to bond two components into one, characterized in that said apparatus is equipped with a surface treatment apparatus that is equipped with a device that causes gas discharge at or close to atmospheric pressure; and with a device that exposes the surface of at least one of the components to the gas containing active species generated by said gas discharge.

Furthermore, the invention provides a soldering apparatus that, by using solder as a brazing material, can remove such undesirable materials as oxide from the bonding surface, improve wettability, and effectively remove organic substances, such as flux, that remain after soldering.

It is desirable that the device for generating the gas discharge be equipped with a gas duct that consists of a dielectric material and a device that supplies the gas into said gas duct, and that a high frequency voltage be applied to the electrode provided on the exterior of the gas duct. The material to be treated can then be exposed to the reactive species in the gas generated by the above mentioned gas discharge device, or the gas flow containing said reactive species can be blown onto the material to be treated. Furthermore, by using a cylindrical dielectric tube to form the gas duct, and installing on its perimeter an electrode that can slide in the axial direction of said duct, it is possible to change the location at which the electrical discharge occurs inside the dielectric tube, and to adjust surface treatment according to various factors such as the type of gas used, effects on the material to be treated, etc. It is also possible to use nonpolar electrical discharge using microwaves instead of high frequency electrical discharge.

Furthermore, it is possible to minimize damage to the material to be treated, by trapping ions contained in said gas flow with a metal mesh installed on the gas flow outlet; and more particularly, to provide low cost, high quality soldering when bonding components to a substrate.

When using high frequency voltage to generate electrical discharge, the electrical discharge area can be easily moved if a coaxial cable is used to connect the electrode to which the high frequency voltage is to be applied, and the grounded electrode. This configuration improves operability, enables automation through the use of robots, etc., and provides a soldering apparatus suitable for actual factory applications.

BRIEF DESCRIPTION OF THE DRAWINGS

FIG. 1A shows a longitudinal section of Working Example 1 of the surface treatment apparatus used in the invention. FIG. 1B is a cross section along line B—B. FIG. 2 is a longitudinal section showing a modified example of the working example in FIG. 1.

FIG. 3A shows a longitudinal section of Working Example 2 of the surface treatment apparatus. FIG. 3B is a cross section along line B—B.

FIG. 4 shows a longitudinal section of Working Example 3 of the surface treatment apparatus.

FIGS. 5A, 5B and 5C are cross sections of various working examples, each showing a different structure for a dielectric discharge type electrode.

FIG. 6 is a perspective view of the so called gun type surface treatment apparatus based on the invention.

FIG. 7A is a perspective view showing the configuration for the surface treatment apparatus, in which the electrical discharge generating portion and the nozzle are separated. FIG. 7B shows an example in which the nozzle portion has been modified.

FIG. 8 is a perspective view showing a cross section of the configuration of a line type surface treatment apparatus.

FIGS. 9 and 10 are also perspective views, each showing a cross section of a different working example for a line type surface treatment apparatus.

FIGS. 11 and 12 are partial perspective views, each showing a different gas duct and electrode configuration.

FIGS. 13 through 16 are schematic flow diagrams, each showing a different working example of a reflow method soldering device based on the invention.

FIGS. 17 and 18 are schematic flow diagrams, each showing a different working example of a flow method soldering device based on the invention.

FIG. 19 is a flow diagram showing the process that uses the soldering method and the apparatus of the invention, in which both SMT and COB methods are employed for mixed, double sided mounting of components on a substrate.

FIG. 20 is a flow diagram showing the process in which the invention is used for mounting components on both sides of a substrate.

FIGS. 21 through 23 are block diagrams each showing a configuration for supplying moisture to the reactive gas.

Ideal method for implementing the invention:

The invention is explained in detail below, using appropriate working examples and with reference to the attached drawings.

FIG. 1 schematically shows the structure of an appropriate working example of the surface treatment apparatus used for soldering based on the invention. A so called gun type surface treatment apparatus 1, which is used to generate gas discharge, is equipped with a quartz dielectric tube 2 that has been formed into a thin walled, approximately cylindrical shape. A pair of high frequency electrodes 3a and 3b, facing each other across the dielectric tube 2, are positioned on the outside of the dielectric tube 2 near its center, thus forming a so called capacitive coupling discharge structure. The high frequency electrodes 3a and 3b are completely enclosed in an insulator 4, and finally a thin walled metal case 5 is installed to enclose the entire dielectric tube 2. The dielectric tube 2 possesses at its upper end, a gas inlet 6 which is connected to a gas supply device 7 via a flexible tube 8; and possesses at its lower end, a gas jet outlet 9 which faces downward. A metal mesh 10, which is integrated into the metal case 5, is positioned directly below the gas jet outlet 9. The substrate to be soldered 11 is positioned horizontally on a holder 12, with its bonding surface for mounting components, etc. facing upward, below the gas jet outlet 9 and the metal mesh 10.

One of the high frequency electrodes, 3a, is connected to an impedance matching circuit 14 via a coaxial cable 13, and is also connected to a high frequency power supply 15 via said circuit. One end of the metal mesh wire on the outside of the coaxial cable 13 is grounded via the connector of the impedance matching circuit 14, while the other end is connected to either the electrode 3b or the metal case 5. The electrode 3b is electrically connected to the metal case 5 by, for example, a screw 16 that is screwed in from the outside of the case. In this way, the metal case 5, the electrode 3b, and the metal mesh 10 are grounded. These parts are grounded in order to prevent electric shock from the voltage that occurs on the surface of the insulator 4, and to minimize the effects on humans of the leakage from the high frequency field. The core of the coaxial cable 13 is connected to the other high frequency electrode 3a which is not electrically connected to the case 5, and receives high frequency voltage from the power supply 15. By grounding both the metal case 5 and the metal mesh 10 using the coaxial cable 13, it is possible to ensure the safety of the surface treatment apparatus 1 of the invention, particularly in actual applications when a low frequency power supply is used. Additionally, use of the cable makes the device 1 mobile as a gun type unit, thus improving productivity. Naturally, other methods can be used to ground the metal mesh if they do not interfere with the operation.

A specified gas is supplied from the gas supply device 7, via the flexible tube 8, to the gas supply inlet 6, to replace the atmosphere inside the dielectric tube 2 with the above mentioned gas. When high frequency voltage from the power supply 15 is applied to one of the electrodes 3a, a gas discharge occurs between the two electrodes 3a and 3b inside the dielectric tube 2.

In the electrical discharge region 17, plasma causes various types of reactions in said gas, such as dissociation, ionization, and excitation, which in turn generate active species, such as excited species and ions of said gas. Because the gas is continuously supplied from the gas supply device 7 to the gas supply inlet 6, the gas containing the active species is jetted out through the gas jet outlet 9 onto the surface of the substrate 11 as a reactive gas flow.

In FIG. 1, the positions of the high frequency electrodes 3a and 3b are stationary, relative to the dielectric tube 2. However, in another working example of the invention, it is possible to install the electrodes so that they can slide along the outside of the dielectric tube 2 in the axial direction. In the latter configuration, the location of gas discharge inside the dielectric tube 2 and, consequently, the electrical discharge region can be easily changed along said axis direction, either closer to or away from the gas jet outlet 9. Therefore, it is possible to adjust the surface treatment to be applied to the substrate 11, based on the type of gas supplied by the gas supply device 7, and on the usage conditions. The usage conditions include, for example, the effects of the heat radiating from the electrical discharge and from the electrodes on the substrate, and the substrate's direct exposure to active species.

Naturally, the emission of electrical discharge is strong near the high frequency electrodes 3a and 3b, and the electrical discharge region 17 can spread all the way into the interior of the dielectric tube 2 if the applied high frequency power increases. When the electrodes 3a and 3b are positioned near the gas jet outlet 9, electrical discharge jumps out through the outlet, causing a plasma torch phenomenon. This phenomenon can also be controlled (intensified or suppressed) by controlling the high frequency power that is applied and the flow rate of the oxygen or helium contained in the above mentioned supplied gas. For example, the above mentioned phenomenon reaches its peak when helium is at a particular flow rate; and the electrical discharge itself changes from a glow discharge to an arc discharge when the oxygen flow rate becomes excessive.

The high frequency electrodes 3a and 3b, located on the outside of the dielectric tube 2 as explained above, are not exposed to the plasma, thus preventing both electrode wear and contamination, caused by sputtering, of the material being treated. Furthermore, it is possible to reduce the thermal effects of the heat radiated from the electrodes 3a and 3b, even when they are continuously used for a long time.

By installing the metal mesh 10 on the gas jet outlet 9 as described above, the ions and electrons in the plasma contained in said gas flow can be trapped and neutralized, thus preventing adverse effects of the ions on the substrate 11. However, the metal mesh need not be installed if no actual electrical damage is expected from the ions on the material to be treated, or if the work conditions or the structure of the apparatus preclude any risk of electric shock.

If the metal mesh 10 is installed near the gas jet outlet 9, capacitive coupling gas discharge will occur between the electrode 3a on the power supply side and the metal mesh 10 as the pair of electrodes 3a and 3b are moved closer to the gas jet outlet 9. Furthermore, in some cases, gas discharge may occur alternately between the power supply electrode 3a and the grounded electrode 3b, and between the power supply electrode 3a and the metal mesh 10, depending on the power applied, the flow rates and flow rate ratio of the supplied gases. This kind of phenomenon will still occur even if the surface of the metal mesh is coated with an insulating material. Note that such a measure will prevent arc discharge from occurring between the electrode 3a on the power supply side and the metal mesh 10. However, if the insulating coat on the metal mesh 10 is thick, the original objective of the mesh, i.e., ion trapping effects, will be reduced.

A test was conducted to determine the effects of the electrical discharge that jumps out through the gas jet outlet 9, on the material to be treated, when the metal mesh 10 is not installed. An oscilloscope was used to measure the potential of a metal that was electrically floating after exposing it to the above mentioned electrical discharge. Measurements were made of the difference in the potential between the material being treated and the grounded electrode, while varying the power supply frequency of the high frequency power supply 7. The results are shown below. Here, Vdc is the potential when DC voltage is applied, and Vp—p is the potential when AC voltage is applied.

(Power supply frequency) (Measured potential)

13.56 Mhz ... Vdc=1 V, Vp—p=3 V

400 KHz ... Vdc=−20 V, Vp—p=10 V

20 KHz ... Vdc=−20 V, Vp—p=30 V

In cases in which the frequency was 400 KHz or lower, a large pulse shaped potential of 50 V or more was observed.

Therefore, it is recommended that a normal means of preventing electric shock be used as a preventive measure when directly touching the electrical discharge region 17 or performing an operation while holding a metal that is electrically floating. The same precaution should be taken when the material to be treated is susceptible to electrical damage.

In contrast, when the metal mesh 10 is installed, both Vdc and Vp—p mentioned above become 0 V regardless of the power supply frequency, thus enabling safe operation for both human operators and the material to be treated. However, care must be taken, particularly when the power supply frequency is 400 KHz or lower, because the electrical discharge could jump out of the metal mesh 10 and the electrical discharge region 17 could spread, or arc discharge might occur.

In this invention, it is possible to cool or heat the substrate 11, the material to be treated. The temperature of the substrate 11 can be indirectly controlled, using a sheath heater to heat the holder 12 or a water pipe to cool it. Depending on the conditions, the substrate 11 could be heated to temperatures of 200° C. or higher by the electrical discharge itself, the gas that is jetting out, or the heat radiated from the electrode 3. Therefore, if it is necessary to protect the substrate 11 against heat, the holder 2 can be used to cool the substrate 11 during the processing. On the other hand, if it is not necessary to protect it against heat, the substrate 11 should be actively heated. Because this invention is a type of reduction method using chemical reactions, heating often accelerates the reactions. Furthermore, surface treatment and soldering can be simultaneously achieved by applying the electrical discharge treatment of the invention while heating the substrate 11, on which the solder and components have been placed, to a temperature above the melting point of the solder.

A light source, such as a halogen lamp, could also be used as a heating device. This method minimizes time loss by quickly heating the surface to be rinsed, and also makes it easy to heat the work material even if it has a complicated shape with severe irregularities. It is also possible to use a short wave light, i.e., ultraviolet light, from the above mentioned light source. This method enhances rinsing performance, because the ultraviolet light severs the chemical bonds of organic substances, in addition to providing the heating effect.

If the electrical discharge treatment is to be applied for an extended period of time, it is recommended that the high frequency electrodes 3a and 3b be cooled. This cooling is intended to cool the dielectric tube 2 that is directly exposed to the electrical discharge, and various known techniques can be used. For example, if an apparatus, such as a cooling water pipe, is used for cooling the high frequency electrodes 3a and 3b, the pipe must be of an insulating type and its length must be at least 30 cm, due to the conductivity of water.

To remove organic substances, such as flux, from the surface of the substrate 11 in the working example described above, it is possible to use an ultraviolet light generation device positioned near the substrate 11 to radiate ultraviolet light on the surface of the substrate 11 to help break down the organic substances, or to use a blowing device to supply warm or cool air to directly heat or cool the substrate 11. Furthermore, by installing the blowing device or a device that vibrates the substrate 11 being treated, it is possible to simultaneously remove particles covered with organic substances, such as a resist.

The use of the surface treatment apparatus 1 explained above to expose the bonding surface of the substrate 11 to be soldered to the active species, generated by gas discharge in the supplied gas, significantly improves the properties of said bonding surface and its wettability to solder. Because of this improvement, good soldering results can be obtained even when no flux is used, or when a no-rinse flux possessing low wettability is used. As for the voltage to be applied to the electrodes 3a and 3b, it is desirable to use a high frequency voltage of 13.56 MHz or 10's of KHz, for example 20 KHz, depending on the type of gas to be supplied.

Any type of gas, e.g., rare gas such as helium, nitrogen, compressed air, or oxygen, can be used as the gas to be supplied from the gas supply device 7 to the dielectric tube 2, as long as it does not adversely affect the substrate. However, if oxidation of the substrate 11 is not desirable, it is recommended that gases other than oxygen be used.

Surface treatment using the above mentioned electrical discharge can be used for the preprocessing or post-processing required for soldering. For example, to remove the organic substances adhering to the bonding surface of the substrate 11 in advance, or to remove the residual flux after soldering, a mixed gas consisting of helium and oxygen, for example, is supplied from the gas supply device 7. This gas generates active species, such as oxygen ions and excited species, which react with the above mentioned organic substances and turn into carbon monoxide, carbon dioxide, and steam, which are then removed from the bonding surface. This reaction gas can be removed via the duct provided near the substrate 11.

For example, in one working example, a mixed gas consisting of helium and oxygen is used as the gas to be supplied, and a high frequency voltage of 13.56 MHz with 80 W power was applied while the flow rates of helium and oxygen were set at 20 SLM and 200 SCCM, respectively. The oxygen flow rate was maintained at approximately 1% that of helium. A slightly bluish white electrical discharge (plasma) occurred inside the dielectric tube 2. In this case, the generated active species are oxygen radicals. A ceramic substrate (7059 glass made by Corning Corporation) was used as the substrate 11, which was baked after being coated to a thickness of 1 micron with a novolac type resist (OFPR-800 made by Tokyo Ohka Kogyo Co., Ltd.). This resist, which is an organic substance, was converted into steam, and carbon dioxide, etc. by reacting with the oxygen radicals contained in the above mentioned gas flow, and was removed from the surface of the substrate 11.

A similar effect in removing organic substances, i.e., the ashing effect, can be obtained if compressed air or a mixed gas consisting of nitrogen and oxygen is used as the electrical discharge gas, in place of the mixed gas consisting of helium and oxygen. Furthermore, a similar ashing effect can also be obtained by using only a rare gas as the supply gas.

For example, when only helium gas is supplied to the dielectric tube 2 via the flexible tube 8, electrical discharge of only this helium gas is generated, and the gas flow containing the generated active species is jetted out through the gas jet outlet 9. The energy exchange between the helium radicals generated by the electrical discharge and the oxygen that is naturally present both near the gas jet outlet 9 and the metal mesh 10, and in the atmosphere between these components and the substrate 11, generates oxygen radicals which are then used for ashing. Therefore, in this case, better ashing effects can be obtained by controlling the electrical discharge region 17 so that it jets out through the gas jet outlet 9 toward the substrate 11, and by removing the metal mesh 10. In this method, only a rare gas is used to cause the electrical discharge inside the dielectric tube 2, thus suppressing or preventing contamination of the interior of the dielectric tube 2. As a result, stable electrical discharge can be achieved over an extended period of time. Additionally, the method results in lower costs because oxygen need not be supplied as a reaction gas.

A gas containing nitrogen, fluorine compounds ($CF_4$, $C_2F_6$, $SF_6$, etc.), or an organic substance can be used as the electrical discharge gas, to improve the wettability of a bonding surface to solder, or to remove oxides, such as CuO film formed on the copper pad surface, from the bonding surface of the substrate 11. In this case, said oxides react with active species, such as nitrogen ions and excited species, and turn into nitrogen oxides; or react with active species, such as fluorine ions and excited species, and turn into fluorides, which are then removed from the surface of the substrate 11. When a gas containing an organic substance is used, the oxides on the above mentioned substrate surface react with the active species, such as organic substances, carbon, hydrogen ions, and excited species, which are generated through dissociation, ionization, and excitation of the above mentioned organic substance. In this way, hydroxyl compounds, oxo compound, carboxylic acid, carbon dioxide, and steam are formed, which are then removed from the above mentioned substrate surface.

The same effects can also be obtained by coating the surface of the substrate 11 with the above mentioned organic substance. In this case, the energy level in the electrical discharge region 17 increases, due to dissociation, ionization, and excitation of the gas caused by plasma. Part of said organic substance coated on the substrate surface evaporates, is then dissociated, ionized, and excited by exposure to the electrical discharge and then converted into such active species as organic substances, carbon, hydrogen ions, and excited species. Other parts of said organic substance are dissociated, ionized, and excited by receiving the energy from the active species of the high energy gas, and are converted into such active species as organic substances, carbon, hydrogen ions, and excited species. These active species can offer the same effects as those obtained when an organic substance is added to the gas. Furthermore, unlike the chlorine compounds contained in fluxes, these active species do not remain on the substrate surface.

Examples of electrical discharge gases that can be used to etch and remove oxides from the surface of the substrate 11 include a gas mixture consisting of helium or compressed air and carbon tetrafluoride ($CF_4$). Oxygen can be substituted for the compressed air. Carbon tetrafluoride has the effect of preventing the spread of electrical discharge, and thus if too much of it is added, the electrical discharge will be severely localized inside the dielectric tube 2. As a result, the electrical discharge region 17 will have difficulty jumping out through the gas jet outlet 9. On the other hand, however, once the electrical discharge region 17 jumps out through the gas jet outlet 9, it will spread onto the surface of the substrate 11 and will end up expanding its etching area.

In this working example, when the flow rate of the above mentioned gas was set at 20 SLM of helium and 100 SCCM of $CF_4$, the etching speed was approximately 10 micron/minute. The etching rate increased when about 100 SCCM of oxygen was added to the gas mixture. For example, the inventor of this patent application has confirmed that the maximum level etching effect can be obtained when the gas mixture contains a volume of fluorine compound (e.g., $CF_4$) of between 0.5 and 5%, ideally 1%, as a percentage of helium; and a volume of oxygen of between 0.5 and 5%, ideally 1%, as a percentage of helium.

Generally speaking, the use of a rare gas, such as helium, at or close to atmospheric pressure, along with the application of high frequency voltage, offers the following advantages. Gas discharge can be easily and uniformly generated, and the damage sustained by the material being exposed can be minimized. However, the cost of this option will be high because of the high price of the gas itself. To solve this cost issue, it is possible to supply a rare gas, such as helium or argon, from the gas supply device 7 only during the start of the electrical discharge. Then, once the electrical discharge has taken place through voltage application, a switch can be made to another appropriate but less expensive gas. Another method of lowering costs is to supply a gas mixture containing a rare gas, such as helium, along with oxygen and/or $CF_4$, from the gas supply device 7 to the gas inlet 6 via the flexible tube 8. Then, only the supply of the rare gas is stopped once electrical discharge has begun, and the discharge is continued with only the reactive gas. In this case, the discharge will be maintained, but usually in the form of arc discharge.

When using a gas mixture containing helium and oxygen, for example, electrical discharge can be started using low power, if the percentage of oxygen flow relative to helium is small. However, if both oxygen and helium flow rates become small, the electrical discharge will be difficult to start. Furthermore, a low oxygen flow rate will enable the maintenance of an electrical discharge resembling a smooth glow discharge. As the oxygen flow rate is increased, the electrical discharge region 17 tends to become localized, and eventually shifts to streamer coronas (corona streams), or to a mode similar to that of arc discharge, accompanied by a loud noise. When the discharge resembles arc discharge, the temperature rises in the part of the dielectric tube 2 that is close to the electrical discharge region 17. Once the electrical discharge begins, it will continue even if the oxygen flow rate is at a level that normally makes discharge difficult. However, when both the dielectric tube 2 itself and its wall were made thin (15 mm or less and 1 mm or less, respectively, in this working example), the discharge did not shift to arc discharge, and a large number of streamer coronas (corona streams) were observed.

As explained above, it is also possible to use only a reactive gas or a mixture of nitrogen and a reactive gas from the start, without using any rare gas. In particular, stable streamer coronas (corona streams) can be obtained by reducing the frequency of the high frequency power supply 15. For example, if a high frequency voltage of 20 KHz is used, discharge can be started with compressed air. In this method, processing speed does not markedly decline, even when the discharge inside the dielectric tube 2 shifts to arc discharge. Therefore, operating costs can be substantially reduced by paying attention to the cooling of the electrical discharge region 17, and to the heat resistance temperature of the substrate 11, etc. This method is primarily suited to applications in which the material to be processed is resistant to thermal and electrical damage, and low cost is important. It should also contribute to the worldwide movement toward the elimination of chlorofluorocarbon (CFC) and triethane.

FIG. 2 shows a modified example of the working example in FIG. 1, in which a reactive gas supply device is provided separately from the gas supply device 7. This reactive gas supply device is equipped with a gas supply pipe 18 possessing an opening located between the gas jet outlet 9 and the metal mesh 10. A rare gas, for example helium alone, is supplied from the gas supply device 7 to the dielectric tube 2, causing electrical discharge of just the helium gas. On the other hand, depending on the processing objective, a reactive gas containing oxygen for ashing, compressed air for wettability improvement, or $CF_4$ or a gas mixture of $CF_4$ and oxygen for etching, can be supplied from the above mentioned reactive gas supply device via the gas supply tube 18 to the region between the gas jet outlet 9 and the metal mesh 10. Reactive active species are generated through energy exchange between the helium radicals that are generated by the electrical discharge and that jet out from the gas jet outlet as a gas flow, and the above mentioned reactive gas. These species are then used for the surface treatment of the substrate 11. Naturally, the efficiency of the surface treatment will be higher if the metal mesh 10 is removed.

As explained above, the invention enables high quality soldering by greatly enhancing the wettability of the bonding surface through improving its properties before soldering and removing oxides through etching. It also provides a method of easily and thoroughly removing the flux remaining after soldering.

Furthermore, the invention can enhance the effects of the reactive gas containing the above mentioned active species through the addition of moisture. In particular, the inventor of this patent application has confirmed that etching speed can be significantly improved. For example, the removal of a CuO film from the copper pad surface of a substrate took only about 20 seconds, when a gas mixture consisting of helium and carbon tetrafluoride was used with the addition of moisture, such as steam; whereas the same operation had taken about 20 minutes without the addition of moisture.

FIGS. 21 through 23 show specific configurations for adding moisture in order to enhance the effects of the electrical discharge treatment of the invention. In the working example in FIG. 21, a bypass is provided in the middle of a pipe 78, used for supplying the gas from the gas supply device 7 to a surface treatment apparatus 77. Part of the above mentioned gas is fed into a tank 80 after being regulated by a valve 79. The tank 80 contains water, ideally, purified water 81, which is heated by a heater 82 and easily turned into steam. The gas introduced into the tank 80 returns to the pipe 78 after absorbing the steam, and mixes with the above mentioned gas directly supplied from the gas supply device 7, before being fed to the surface treatment apparatus 77.

The addition of moisture in this way to the gas to be fed to the surface treatment apparatus 77 is beneficial because it eliminates the risk of condensation on the material to be treated. The amount of moisture is adjusted by controlling the valve 79, as well as the temperature of the water 81 in the tank 80 through the use of the heater 82.

In the other working example shown in FIG. 22, an atomizer 83, is installed in the middle of the pipe 78 which connects the gas supply device 7 to the above mentioned surface treatment apparatus; the water 81 is then supplied to this atomizer from the water tank 80. This configuration enables the addition of moisture to the gas to be fed to the above mentioned treatment apparatus. In this case, it is possible to promote the atomization of water by supplying warm water to the atomizer 83 through installing in the tank 80, a heater similar to that used in the working example in FIG. 21. It is also possible to install an air blower and a pipe separately from the gas supply device 7 and the pipe 78, in order to directly force the water atomized by the atomizer 83 into the above mentioned surface treatment apparatus e.g., the dielectric tube 2 described in Working example 1.

Furthermore, in the working example shown in FIG. 23, steam is generated by heating the water 81 in the tank 80 with the heater 82. The steam is then directly supplied, via a pipe 84, to the surface area of the material to be treated where electrical discharge will take place. In this case, the risk does exist that condensation will occur on the surface of the material to be treated, if it is at a relatively low temperature. If it is considered that condensation may adversely affect the above mentioned material to be treated, it is possible to connect the pipe 84 to the above mentioned surface treatment apparatus or to the middle of the pipe 78, so that the moisture is added to the above mentioned gas before the electrical discharge occurs.

If the solder used on the surface of the substrate 11 for bonding components has been oxidized, the oxide can be removed by applying a similar electrical discharge treatment to the solder, thus ensuring good soldering results. It is also recommended that electrical discharge treatment be applied to components that have been oxidized.

Furthermore, according to this invention, the surface of the above mentioned substrate or components, to which electrical discharge treatment is applied before soldering, need not be a metal such as copper. The inventor of this patent application has confirmed that the invention also facilities the removal of oxides even from materials such as glass or ITO, again resulting in high quality soldering.

For example, it was confirmed that excellent wettability and adhesion of solder to glass materials can be achieved, without the use of any flux, by using nitrogen alone as the electrical discharge gas. Therefore, it becomes possible to directly assemble components such as IC chips to the glass surface of a liquid crystal panel, instead of forming a coating on said surface in advance of bonding the components via a TAB substrate.

FIG. 3 shows Working example 2 of the surface treatment apparatus of the invention. A high frequency electrode 3 is positioned on the outside of the dielectric tube 2 around its entire perimeter, both of which are completely covered by the insulator 4. Finally, a metal cover 5 is installed to enclose the entire dielectric tube 2. As in the working example in FIG. 1, the dielectric tube 2 is equipped with the gas inlet 6 at its upper end and the gas jet outlet 9 at its bottom end. The metal mesh 10 is integrated into the bottom of the metal cover 5 below the gas jet outlet 9. The high frequency electrode 3 is connected to a high frequency power supply via an impedance matching circuit, neither of which are shown in the drawing. Both the metal cover 5 and the metal mesh 10 are grounded. As in the working example in FIG. 1, coaxial cables can be used for connecting the electrode 3 with the above mentioned power supply, and for grounding the metal cover 5. Replacing the atmosphere inside the dielectric tube 2 with the gas supplied through the gas inlet 6, and applying high frequency voltage from the above mentioned power supply to the electrode 3 cause a gas discharge between said electrode and the grounded metal mesh 10. The gas flow containing the active species of the supplied gas is then blown onto the substrate 11 while the metal mesh 10 traps ions.

The inventor of this patent application has empirically confirmed that the above mentioned discharge mode allows the treatment speed to be increased without causing any electrical damage to the material being treated, or jeopardizing worker safety.

In Working example 2, it is possible to configure the surface treatment apparatus of the invention without installing the metal mesh 10. In this case, the substrate 11 or the holder 12 will be considered a grounded electrode, and electrical discharge will be generated between it and the high frequency electrode 3. This discharge mode is effective when electrical damage to the material can be ignored, or when safety can be guaranteed by enclosing the surface treatment apparatus in some type of case.

FIG. 4 shows Working example 3 of the Surface treatment apparatus of the invention. A surface treatment apparatus 20 is equipped with a glass tube 21 consisting of a double walled coaxial structure, in place of the dielectric tube 2 in Working example 1. An internal glass tube 22 is open at the top end and closed at the bottom end. An external glass tube 23 is closed at the top end, and together with the internal glass tube 22, forms a ring shaped chamber 24. A gas jet outlet 9 is provided at the tip of the roughly conical bottom area of the external glass tube 23. A gas inlet is provided on top of the ring shaped chamber 24, which is connected to an external gas supply device.

A bar shaped, removable high frequency electrode 25 is inserted into the internal glass tube 22 through its top opening. The electrode 25 is connected to a high frequency power supply using a coaxial cable via an impedance matching circuit, as in Working examples 1 and 2. A conical electrode 26, which is grounded as the counter electrode of the electrode 25, is installed on the entire exterior perimeter of the conical portion of the external glass tube 23. When a gas is supplied through the above mentioned gas inlet into the ring shaped chamber 24, and high frequency voltage is applied to the electrode 25, a gas discharge occurs between the power supply electrode 25 and the grounded electrode 26 inside said ring shaped chamber. It is possible to adjust the position of the electrical discharge region 27, as in Working example 1, by changing the position of the tip of the electrode 25 by moving it inside the internal glass tube 22.

Although the capacitive coupling discharge mode is used in all of the above mentioned working examples, it is possible to obtain similar effects by using inductive coupling discharge, or nonpolar discharge using short wave microwaves. However, the use of microwaves makes it difficult to use a coaxial cable for connecting the above mentioned impedance matching circuit with the above mentioned high frequency electrode, and thus may hamper the operational convenience of a gun type unit. In each of the above mentioned working examples, it is possible to selectively treat the substrate surface by making the gas jet outlet smaller, or by installing a masking device between the gas jet outlet (or the metal mesh) and the substrate 11.

FIGS. 5A through 5C schematically show working examples of surface treatment apparatuses that use the inductive coupling discharge mode. The working example in FIG. 5A is equipped with a long, nearly cylindrical discharge tube 28 consisting of a dielectric material. The discharge tube 28, which is horizontally placed, possesses a gas inlet 29 at one end, while its other end is closed. A coil shaped electrode 30, which is connected to a high frequency power supply, is wound on the outside of the discharge tube 28 along most of its length. The coil electrode 30 is covered with an insulating material on the outside, and finally a metal cover encloses the entire assembly of the discharge tube 28. Furthermore, multiple gas jet outlets 31 are installed on the discharge tube 28 linearly along its axis. When high frequency voltage is applied to the coil electrode 30 in this configuration, gas discharge occurs in such a way that an electrical discharge region 32 spreads to the entire interior of the discharge tube 28. The gas flow containing the active species generated by the discharge then jets out through each of the gas jet outlets 31 toward the material to be soldered, e.g., the bonding surface of a substrate.

In the modified working example in FIG. 5B, the discharge tube 28 is vertically positioned, with the coil electrode 30 wound around it. The discharge tube 28 possesses at its top end, a gas inlet, not shown in the drawing, while the gas jet outlets 31 are provided at the tips of the other branched ends of the tube. Because the electrical discharge region 32 in this configuration is formed in a location away from the gas-jet outlets 31, it is not necessary to install metal meshes on the gas jet outlets 31 to prevent electrical damage to the material being treated or injury to operators.

In another working example in FIG. 5C, the bottom of the discharge tube 28, on which the coil electrode 30 is wound in a similar manner, is equipped with a gas jet outlet 31 that opens to a horn shape. This configuration enables surface treatment of a wide area of the material to be treated, using a relatively small electrical discharge region 32. Furthermore, if it is necessary to protect the area surrounding the treatment area, the gas jet outlet 31 can be completely fitted over the material to be treated.

FIG. 6 shows an overview of the treatment apparatus 33 that is used for the local application of electrical discharge to materials to be processed, such as substrates, which is required in operation settings where soldering is performed. The treatment apparatus 33 possesses a so called gun type structure, which can be held by the operator as needed, and is equipped with an electrical discharge generating area 35, installed inside a cylindrical nozzle 34 that possesses an opening at its tip. The electrical discharge generating area 35 has the same basic structure as those in the above mentioned working examples, and is connected to a gas supply device and a power supply, neither of which are shown in the drawing. In this structure, a reactive gas flow containing active species generated by electrical discharge is guided by the tip opening 36 of the nozzle 34 to jet out toward the surface of the substrate 11, from the bottom area of the electrical discharge generating area 35.

FIG. 7A shows a surface treatment apparatus 40, in which the electrical discharge generating area 37 and the nozzle area 38, used for jetting out the reactive gas flow, are provided separately and connected via a flexible tube 39. The electrical discharge generating area 37 is housed inside a main unit 41 which can be either a fixed type that integrates a power supply and a gas supply trait, etc. (not shown in drawing), or a mobile type. The reactive gas flow generated here is supplied via the flexible tube 39 and is jetted out toward the substrate 11 through the nozzle area 38. As for the flexible tube, a length of 5 m, or ideally as short as 2 m, can be used to effectively deliver the active species to the substrate. Configuring the nozzle area 38 as a separate unit improves productivity, and also allows the processing capacity of the apparatus 40 to be increased as needed.

The nozzle area 38 installed at the tip of the flexible tube 39 is removable. FIG. 7B shows a nozzle area 42 which is also removable. The nozzle area 38 in FIG. 7A consists of a relatively large disk which is capable of treating a large area at one time, while the nozzle area 42 in FIG. 7B is rectangular in shape and is suitable for treating relatively small areas. This ability to change the nozzle area enables the apparatus to adapt to changes in the material to be treated and to usage conditions, thus enhancing operational flexibility.

As explained above, the invention allows the surface treatment apparatus and the material to be treated to move easily relative to each other. This ability makes it possible to treat a large number of areas, or to increase the size of the area to be treated. Furthermore, when the frequency of the high frequency power supply to be used is 13.56 MHz or less, the mobility of the apparatus can be improved by connecting the impedance matching circuit and the high frequency electrode using a coaxial cable. This configuration improves mobility and makes it possible to build an automated field system through the use of robots, etc.

FIG. 8 shows a working example of a so called line type surface treatment apparatus that treats the surface of a material in a linear fashion. This surface treatment apparatus 43 is equipped with a pair of dielectric plates 44 that are made of quartz and are spaced at a constant narrow gap. The narrow chamber formed by the two dielectric plates 44 along their length is closed at both the front and back ends, and its top opening forms a gas inlet 45 to be connected to a gas supply device. Furthermore, the bottom opening of this chamber is formed into a narrow gas jet outlet 46 by the inwardly sloping bottom areas of the dielectric plates 44, and extends in the lengthwise direction. In another working example, the gas jet outlet 46 could be in the form of numerous nozzles linearly arranged.

A pair of high frequency electrode plates 47 are positioned, facing each other, on the exterior surface of the dielectric plates 44, extending along their entire length. The high frequency electrode plates 47 are covered with insulators 48, and finally, a metal cover 49 is installed to protect the electrode plates 47, and as a shield against electromagnetic interference. As in Working example 1, the pair of electrode plates 47 can be moved along the exterior surfaces of the dielectric plates 44 in all directions, as they face each other. Therefore, the location of the gas discharge and its electrical discharge region can be easily changed in the above mentioned chamber between the dielectric plates 44. Furthermore, it is possible to install the metal cover 49 so that it encloses the entire surface treatment apparatus 43.

One of the electrode plates 47 is connected to an impedance matching circuit and a high frequency power supply via a coaxial cable, as in the working examples described above. The other electrode plate 47 is electrically connected to the metal cover 49, and is grounded via the mesh metal on the outside of the above mentioned coaxial cable. A cooling device is installed to cool both of the electrode plates 47 for continuous operation over an extended period of time. Furthermore, it is possible to install a metal mesh, not shown in the drawing, below the gas jet outlet 46 and between it and the material to be treated. This metal mesh can be grounded by connecting it to the metal cover 49.

Replacing the atmosphere inside the above mentioned chamber by supplying a gas through the gas inlet 45, and applying high frequency voltage to the electrodes 47 generates a gas discharge botch between the two electrodes 47 and in their vicinity inside the above mentioned chamber, along the entire length of the dielectric plates 44. Then, the reactive species of the above mentioned gas activated by the discharge are blown onto the substrate 11 positioned below the gas jet outlet 46. In this working example, the substrate 11 is treated along a linear path by the above configuration. However, a wider area can be treated by moving the substrate 11 and the treatment apparatus 43 relative to each other. Naturally, it is also possible to use nonpolar discharge using short wave microwaves, instead of high frequency discharge.

If the electrode plates 47 are moved downward along the outer surface of the dielectric plates 44, closer to the gas jet outlet 46, the above mentioned discharge gas will jet out from the gas jet outlet, and as a result, the substrate 11 will be directly exposed to the active species. On the other hand, if the electrode plates 47 are moved upward, thus moving the electrical discharge region farther away from the gas jet outlet 46, the above mentioned discharge gas will be directed to the substrate 11 as a gas flow coming out of the gas jet outlet.

To use the surface treatment apparatus 43 of this working example to remove the flux remaining on the surface of the substrate 11 to be soldered, supply a gas mixture of helium and oxygen, for example, into the above mentioned chamber. This working example used a surface treatment apparatus, in which a pair of 1 mm thick dielectric plates 44 are facing each other 2 mm apart. The flow rates of helium and oxygen were set at 20 SLM and 200 SCCM, respectively, and the flow rate of oxygen was maintained at approximately 1% that of helium. To this gas mixture, a high frequency voltage of 13.56 MHz with 80 W power was applied to treat the surface of a ceramic substrate with a resist coating. The resulting electrical discharge generated oxygen radicals as reactive species, which reacted with the resist on the substrate 11 to form steam, and carbon dioxide, etc., which were then removed from the substrate surface.

FIG. 9 shows another working example of a line type surface treatment apparatus which possesses a cross section similar to that of the working example in FIG. 4. This apparatus is equipped with two vertical internal glass plates 50 that face each other at a constant narrow gap and are joined at their bottom ends, forming an approximately U-shaped cross section; and with two vertical external glass plates 51 that face each other and are positioned outside and parallel to the internal glass plates 50 at a specified distance. The chamber possessing the U-shaped cross section, formed by the internal glass plates 50 and the external glass plates 51, fully extends in its lengthwise direction. On the top end of this chamber, there are a large number of gas inlets 52, that are to be connected to a gas supply device. On the lower end of said chamber, the bottom portion of the external glass plates 51 slope inward, forming a linear gas jet outlet 53 with a constant narrow gap that fully extends in the lengthwise direction, as in the working example in FIG. 8.

A thin, flat plate shaped high frequency electrode 54 is installed, in a removable fashion, inside the internal glass plates 50 along their entire length. The top of this electrode is T-shaped, and rests on the top ends of the internal glass plates 50. Thin plate shaped electrodes 55, each of which fully extends in the lengthwise direction, are installed on the outside of the above mentioned inwardly sloping bottom portion of the external glass plates 51, near the gas jet outlet 53. The electrode 54 is connected to a high frequency power supply, and the electrodes 55 are grounded as the counter electrodes. The top end of the electrode 54 that protrudes from the internal glass plates 50 is covered by an insulator 56, and finally, a metal cover 57 is installed on the outside to enclose the entire surface treatment apparatus.

When high frequency voltage is applied between the electrode 54 and the electrodes 55 in this configuration, a gas discharge occurs inside the above mentioned chamber, near the gas jet outlet which is positioned between said electrodes. In this working example, an electrical discharge region 58 is formed near the material being treated, thus resulting in a surface treatment apparatus possessing better power efficiency.

FIG. 10 shows still another working example of a line type apparatus. Similar to the external glass plates 51 in the working example in FIG. 9, this working example is equipped with two vertical external glass plates 59 that face each other, with their bottom portions sloping inward to form a linear gas jet outlet 60 that fully extends in the lengthwise direction. A pair of thin, flat plate shaped high frequency electrodes 61 are installed along the inside surfaces of the external glass plates 59, along their entire length and extending from the top of the external glass plates 59 to the area slightly above the above mentioned sloping portions. Furthermore, internal glass plates 62 are installed so that, together with the external glass plates 59, they encase the electrodes 61. A pair of grounded electrodes 63 are glued to the outside of the above mentioned bottom portions of the external glass plates 59, near the gas jet outlet 60, as the counter electrodes of the electrodes 61 that are connected to a high frequency power supply. Furthermore, a gas inlet 64 is formed by the opening defined by the top of the opposing internal glass plates 62. In this working example, as in the working example in FIG. 9, gas discharge occurs inside the above mentioned chamber between the adjoining high frequency electrodes 61 and each of the grounded electrodes 63, near the gas jet outlet 60.

FIGS. 11 and 12 show modified examples of the electrical discharge generating structure used for the surface treatment apparatus of the invention. In FIG. 11, multiple matching grooves have been formed on the bonding surfaces of a pair of dielectric plates 64 which are bonded to each other. Then, a pair of electrodes 65 and 66 are glued to the outside of the dielectric plates at corresponding locations. Either electrode 65 or 66 is connected to a high frequency power supply while the other electrode is grounded, and gas discharge is generated by supplying a gas to the gas ducts 67 formed by the above mentioned grooves. Note that it is also possible to form these gas ducts by boring grooves into a solid piece of dielectric material.

In FIG. 12, a gas jet outlet 68 is formed into an L shape, and a pair of electrodes 69 and 70 are glued to its exterior. The gas jet outlet 68 can be formed into various shapes that match the shape of the area of the material to be surface treated, thus enabling the treatment of a specific area of the material, without affecting other areas in any way.

So far, the methods and means of treating the surface of a substrate to be soldered have been explained. By integrating these surface treatment apparatuses with soldering machines, it is possible to produce better soldering results, and to improve overall productivity through more efficient soldering operations and automation. Furthermore, the fact that excellent soldering results can always be obtained, even for minute areas, offers the benefit of a high degree of freedom in designing circuit boards and wiring patterns. Soldering methods and apparatuses involving surface treatment are explained below in detail.

FIG. 13 shows a block diagram of the configuration of a working example of a substrate soldering apparatus based on the invention. A solder paste printer 72, a mounter 73, and a reflow oven 74 are positioned in series on the downstream side of the surface treatment apparatus 71 of the invention. First, after surface treatment is applied to the substrate by the surface treatment apparatus 71, the solder paste printer 72 prints a pattern of paste solder on the above mentioned substrate. Next, the mounter 73 mounts components, and finally, soldering is completed through heating using the reflow oven 74. Application of surface treatment to the substrate at the start, as described above, improves wettability. Thus, excellent soldering results can be obtained even if the amount of flux contained in the paste solder is small or nonexistent, or even if the amount of active elements contained in the flux is small.

Based on the working example in FIG. 13, experiments were conducted using glass substrates with ITO wiring, and glass epoxy substrates with copper wiring. The results are shown in Table 1. The following gases were used in the surface treatment apparatus 31: helium and argon as the rare gas; a gas mixture of oxygen and a rare gas as the oxidizing gas; nitrogen and a gas mixture of nitrogen and a rare gas as the reducing gas; and a fluorine compound and a gas mixture of a fluorine compound and a rare gas as the etching gas. In these experiments, a 13.5 MHz high frequency power supply was used for generating electrical discharge.

TABLE 1

| Gas | Power | Results Glass Substrate | Glass Epoxy |
|---|---|---|---|
| He | 30W | B | B |
| Ar | 50W | B | B |
| $O_2$ | 100W | C | C |
| He + $O_2$ | 30W | C | C |
| $N_2$ | 100W | A | A |
| He + $N_2$ | 30W | A | A |
| $CF_4$ | 100W | A | A |
| He + $CF_4$ | 30W | A | A |

The results were judged according to the following three categories:
A: Good solderability
B: No change after treatment
C: Solderability deteriorated after treatment The above results indicate that solderability improved when a gas containing a reducing gas that includes nitrogen, or a gas containing an etching gas that includes a fluorine compound was used. Similar results were also obtained when a 400 KHz power supply was used.

FIGS. 14 through 18 show other working examples of the soldering apparatus in FIG. 13. In the working example in FIG. 14, the surface treatment apparatus 71 is positioned between the paste solder printer 72 and the mounter 73. After paste solder is printed on the above mentioned substrate by the paste solder printer 72, surface treatment is applied to the substrate by the surface treatment apparatus 71. Next, the components are mounted by the mounter 73, and finally, soldering is completed through heating using the reflow oven 74.

In the working example in FIG. 15, the surface treatment apparatus 71 is positioned between the mounter 73 and the reflow oven 74. After paste solder is printed on the above mentioned substrate by the paste solder printer 72, the components are mounted by the mounter 73. Next, surface treatment is applied to the above mentioned substrate by the surface treatment apparatus 71, and finally, soldering is completed by the reflow oven 74.

In the working example in FIG. 16, the surface treatment apparatus 71 and the reflow oven 74 are integrated as one unit. After paste solder is printed on the above mentioned substrate by the paste solder printer 72, the components are mounted by the mounter 73. Next, surface treatment is applied to the above mentioned substrate by the surface treatment apparatus 71, and then the surface treatment continues during heating with the reflow oven 74, to complete soldering.

The working example in FIG. 17 is a device for wave soldering components onto a substrate, and an inserter 75 and a wave soldering machine 76 are positioned on the downstream side of the surface treatment apparatus 71. After surface treatment is applied to the above mentioned substrate by the surface treatment apparatus 71, the components are inserted by the inserter 75, and then soldering is completed using the wave soldering machine 76. This method makes soldering possible even if the amount of flux is very small or nonexistent.

FIG. 18 is a modification of the working example in FIG. 13, in which the surface treatment apparatus is positioned between the inserter 75 and the wave soldering machine 76. In this configuration, the components are first inserted by the inserter 75, and then surface treatment is applied to the above mentioned substrate by the surface treatment apparatus 71. Finally, soldering is completed using the wave soldering machine 76. This method makes soldering possible even if the amount of flux is very small or nonexistent.

Next, an explanation is provided for a method of assembling mixed types of electronic components onto a substrate by using the soldering method of the invention, along with both SMT (Surface Mount Technology) and COB (Chip On Board) technology. Usually in SMT mounting, a reflow oven is used for heating and soldering after the components are mounted. Thus, in conventional practice, it is necessary to first assemble bare chips, etc. using a COB mounting method, and then follow with SMT mounting, in order to prevent splashing flux, etc. from contaminating the bonding surface of the substrate, or to prevent the formation of oxide films. In contrast, the invention makes it possible to perform SMT mounting first, followed by COB mounting.

As shown in FIG. 19, paste solder is first printed on specified locations on the substrate surface, and then, after mounting all surface mount components, except for the bare chips to be COB-assembled, a reflow oven is used for heating and soldering. Next, it is possible to easily remove the flux adhered to the pad surfaces to be used for wire bonding, and the oxide films formed during heating steps, by using the electrical discharge of the invention to apply surface treatment to the surface of the above mentioned substrate. Afterwards, bare chips are glued to the mounting locations on the substrate, bonded through wire bonding, and their surfaces sealed with a resin for completion. Furthermore, the invention makes it possible to treat only the selected locations on the substrate with an accuracy of about 2 to 3 mm; and in particular, highly selective and effective treatment can be applied to metal pads, between which electrical discharge tends to occur.

When the wet method described earlier is used for rinsing and removing organic substances, there is a risk that the rinsing agent will adversely affect the electronic components on the substrate. On the other hand, ashing inside the vacuum for the same purpose generally requires a great deal of time due to the slow processing time involved, and is ineffective in treating highly irregular areas. If COB mounting is performed first as in conventional methods, surface mount components cannot be positioned near the bare chips that have been resin molded, because of the resulting difficulty in applying paste solder to that area. Furthermore, the paste solder printing mask used for SMT mounting must be equipped with escape holes for the resin mold of the COB mounting, thus resulting in higher mask production cost. Additionally, if the substrate is thin, it tends to warp after COB mounting, making subsequent SMT mounting difficult. The invention, on the other hand, solves these problems, in that it produces higher quality soldering, increases the degree of freedom in designing circuit boards, enables the soldering of smaller size substrates, and facilitates higher density assembly.

FIG. 20 shows a flow diagram of a process in which components are mounted on both sides of a substrate through soldering. First, a paste solder printer is used to print paste solder on one side of the substrate. After the components are placed on the substrate, they are passed through a reflow oven to complete the soldering on this side. Next, the substrate is turned over so that the remaining side faces up, and the electrical discharge surface treatment of the invention is applied. Then, as in normal assembly operations, the paste solder is printed, the components are placed, and finally the mounting of components on both sides of the above mentioned substrate is completed by heating the substrate and components in a reflow oven.

In this type of substrate with double sided mounting, the heat treatment used for soldering on one side oxidizes the copper pads, electrodes, etc. on the other side. However, by using electrical discharge treatment to remove the oxide film, wettability can be recovered to a level equivalent to that before heat induced oxidation, and thus good soldering can be achieved on the second side. Additionally, because the electrical discharge treatment of the invention can be applied to either the top or bottom side of a substrate, regardless of its orientation, it is also possible to apply it to the remaining side before inverting the substrate, after reflow and soldering are completed on the first side. Furthermore, even better soldering results can be achieved by applying electrical discharge treatment to one of the sides before paste solder is printed on it, and to the components to be mounted. As explained above, the invention provides a soldering system that can be used as either an in-line or a field system. The invention has been explained above in detail with references to appropriate working examples. However, the invention can be implemented in many other ways by making various changes or modifications to the above working examples within its technical scope. For example, the dielectric tube and its gas jet outlet can be designed in many other shapes that best suit the processing conditions, in addition to the cylindrical shape.

What is claimed is:

1. A method of bonding two components together employing a brazing material comprising the steps of forming a gas discharge in a gas near or at atmospheric pressure to produce active species of said gas by providing energy across said gas; and then treating a surface of at least one of said components with the active species generated in said gas discharge prior to bonding.

2. The method of claim 1 wherein said gas discharge is generated by means of a nonpolar discharge employing microwave frequency.

3. The method of claim 1 wherein said gas contains a rare gas at least during the initiation of said gas discharge.

4. The method of claim 1 wherein said gas is helium, nitrogen, air or a fluorine compound.

5. The method of claim 1 wherein said gas contains helium or nitrogen and oxygen.

6. The method of claim 1 wherein said gas contains helium or air and a fluorine compound.

7. The method of claim 1 wherein water vapor is added to the gas containing said active species.

8. The method of claim 1 wherein water vapor is added to the surface of said at least one of said components that is to be exposed to said active species.

9. The method of claim 1 wherein at least one of said components is cooled or heated.

10. The method of claim 1 including the step of moving the surface of said at least one of said components laterally during the application of said surface treatment.

11. The method of claim 1 including the step of selectively exposing the surface of at least one of said components to said active species with a mask device.

12. The method of claim 1 wherein said gas is 100% rare gas forming a reactive gas activated by means of said gas discharge near at least one of said components, exposing the surface of said at least one of said components to the active species generated from said gas discharge.

13. The method of claim 12 wherein said reactive gas is contained in an atmosphere adjacent to the surface of said at least one of said components.

14. The method of claim 12 wherein said reactive gas is supplied to the vicinity of the surface of said at least one of said components.

15. The method of claim 1 wherein said brazing material is a solder.

16. The method of claim 15 including the step of performing wave soldering to said components either before or after the application of said surface treatment.

17. The method of claim 15 including the step of performing wave soldering of said components after application of solder to component surfaces prior to their bonding.

18. The method of claim 17 wherein flux is not employed in the solder when the step of soldering is performed after the application of said surface treatment.

19. The method of claim 1 wherein said gas discharge is generated within a gas duct formed of dielectric material, and said gas is fed through said gas duct.

20. The method of claim 19 wherein said gas discharge is generated by applying high frequency voltage to electrodes provided at the exterior surface of said gas duct.

21. The method of claim 20 wherein said electrodes or said gas duct is cooled.

22. The method of claim 19 wherein the surface of at least one of said components is directly exposed to said gas discharge.

23. The method of claim 22 wherein said gas discharge is generated employing at least one of said components as a ground electrode.

24. The method of claim 22 wherein at least one of said components is positioned near an outlet of said gas duct.

25. The method of claim 19 wherein the surface of at least one of said components is exposed to said active species, without direct exposure to said gas discharge, by directing a gas flow from said gas duct containing said active species to said component surface.

26. The method of claim 25 wherein said gas flow is supplied to the surface of at least one of said components via a gas jet outlet provided in said gas duct.

27. The method of claim 26 wherein said gas flow is supplied to the surface of at least one of said components via a grounded metal mesh installed between said gas jet outlet and said component surface.

28. The method of claim 27 including the step of employing said metal mesh as a ground electrode in generating said gas discharge.

29. The method of claim 1, further comprising the step of passing said gas discharge through a gas conduit to a jet outlet at a position away from said formation of said gas discharge for the applying said active species to said surface of at least one of said components.

30. The method of claim 29, wherein said conduit is flexible to permit the selective positioning of said jet outlet.

31. An apparatus for bonding two components together with a brazing material, comprising a gas discharge generating device for receiving a gas and providing a gas discharge near or at atmospheric pressure, and for exposing a surface of at least one of said components to an active species generated by said gas discharge and further comprising brazing means.

32. The apparatus of claim 31 wherein said gas discharge generating device employs microwaves to generate a non-polar discharge.

33. The apparatus of claim 31 wherein said gas includes a rare gas supplied into said gas duct at least during the initiation of said gas discharge.

34. The apparatus of claim 31 wherein said gas for generating said gas discharge is helium, nitrogen, or air.

35. The apparatus of claim 31 wherein said gas for generating said gas discharge contains helium or nitrogen and oxygen.

36. The apparatus of claim 31 wherein said gas for generating said gas discharge contains helium or compressed air and a fluorine compound.

37. The apparatus of claim 31 further comprising means for adding water vapor to said gas containing said active species.

38. The apparatus of claim 31 further comprising means for adding water vapor to the surface of said at least one of said components.

39. The apparatus of claim 31 further comprising means for cooling or heating said at least one of said components.

40. The apparatus of claim 29 further comprising means for moving said gas discharge generating device relative to said at least one of said components.

41. The apparatus of claim 29 further comprising a masking device for selectively exposing a portion of the surface of said at least one of said components to the gas containing said active species.

42. The apparatus of claim 31 wherein said gas is 100% rare gas forming a reactive gas activated by said gas discharge generating device for exposure to the surface of said at least one of said components.

43. The apparatus of claim 42 wherein said reactive gas is supplied to the vicinity of the surface of said at least one of said components.

44. The apparatus of claim 29 further wherein said brazing material is a solder.

45. The apparatus of claim 44 further including means for wave soldering said two components.

46. The apparatus of claim 44 further including means for applying solder to at least one of said components, means for aligning said two components, and means for soldering said two components together.

47. The apparatus of claim 31 wherein said gas discharge generating device includes a gas duct formed of a dielectric material and having means for receiving said gas in said gas duct, said gas discharge generated within said gas duct.

48. The apparatus of claim 47 wherein said gas discharge generating device includes electrode means formed on the exterior surface of said gas duct and means for applying a high frequency voltage to said electrode means.

49. The apparatus of claim 48 wherein said electrode means is longitudinally moveable along said gas duct exterior surface.

50. The apparatus of claim 48 wherein at least one of said components is connected to ground, said gas discharge is generated between said grounded component and said electrode means.

51. The apparatus of claim 48 wherein said gas discharge generating device includes a grounded counter electrode, and said gas discharge is generated between said grounded counter electrode and said electrode means.

52. The apparatus of claim 48 wherein said electrode means is connected, via a coaxial cable, to a impedance matching circuit connected to a high frequency voltage power supply, and wherein the frequency of said high frequency voltage supplied to said electrode means is 13.56 MHz or less.

53. The apparatus of claim 48 further comprising means for cooling said electrode means or said gas duct.

54. The apparatus of claim 51 wherein said gas discharge generating device exposes at least one of said components to the gas containing said active species and includes a gas jet outlet for directing a gas flow to the surface of said at least one of said components.

55. The apparatus of claim 54 further comprising a grounded metal mesh positioned adjacent to said gas jet outlet, said gas discharge generated between said electrode means and said metal mesh, said gas flow containing said active species, after passing through said metal mesh and is directed to the surface of said at least one of said components.

56. The apparatus of claim 54, further comprising a tube connecting said gas discharge generating device to said gas jet outlet at a position away from said gas discharge generating device.

57. The apparatus of claim 56, wherein said conduit is flexible and permits selective positioning of said gas jet outlet.

58. An apparatus for bonding two components together with a brazing material, comprising a gas discharge generating device, said gas discharge generating device receiving a gas and providing a gas discharge near or at atmospheric pressure; means for providing a gas to said gas discharge generating device, means for adding water vapor to said gas; and means for exposing a surface of at least one of said components to be bonded with a brazing material to an active species generated by said gas discharge.

* * * * *